US012789686B2

(12) United States Patent
Lee et al.

(10) Patent No.: US 12,789,686 B2
(45) Date of Patent: Nov. 10, 2026

(54) SEATBACK LOCKING DEVICE

(71) Applicant: DAS CO., LTD, Gyeongsangbuk-do (KR)

(72) Inventors: Jun Hak Lee, Gyeonggi-do (KR); Yong Chang Jung, Hwaseong-si (KR); Hyung Sub Yook, Gyeonggi-do (KR)

(73) Assignee: DAS CO., LTD (KR)

( * ) Notice: Subject to any disclaimer, the term of this patent is extended or adjusted under 35 U.S.C. 154(b) by 336 days.

(21) Appl. No.: 18/393,181

(22) Filed: Dec. 21, 2023

(65) Prior Publication Data

US 2025/0170940 A1 May 29, 2025

(30) Foreign Application Priority Data

Nov. 29, 2023 (KR) ........................ 10-2023-0169574

(51) Int. Cl.
*B60N 2/22* (2006.01)
*B60N 2/90* (2018.01)

(52) U.S. Cl.
CPC ........... *B60N 2/919* (2018.02); *B60N 2/2245* (2013.01)

(58) Field of Classification Search
CPC .................................................... B60N 2/2245
See application file for complete search history.

(56) References Cited

U.S. PATENT DOCUMENTS 5,823,619 A * 10/1998 Heilig .................... B60N 2/888
297/216.12
9,346,374 B2 * 5/2016 Sayama ............. B60N 2/01516
9,994,129 B1 * 6/2018 Shirokane .............. B60N 2/366
10,214,124 B2 * 2/2019 Noguchi .............. B60N 2/3011
11,130,426 B2 * 9/2021 Takezaki ............ B60N 2/02246
11,554,702 B2 * 1/2023 Sayama .................. B60N 2/933
12,024,073 B2 * 7/2024 Borlodan ............. B60N 2/2245
2024/0253547 A1 * 8/2024 Mueller ................... B60N 2/20

FOREIGN PATENT DOCUMENTS

CN 112644348 A * 4/2021 ........... B60N 2/2245
JP 2020132069 A * 8/2020
KR 20070077458 A 7/2007
KR 20160036999 A 4/2016
KR 20240092737 A * 6/2024 ........... B60N 2/2209
KR 20240157276 A * 11/2024 ........... B60N 2/2209

OTHER PUBLICATIONS

Office Action of Application No. KR 10-2023-0169574, mailed on Jun. 25, 2025, 09 pages.

* cited by examiner

*Primary Examiner* — Timothy J Brindley

(57) ABSTRACT

The present disclosure relates to a seat-back locking device, and the seat-back locking device may include: a frame part installed in a seat back and having an opening into which a striker fixed to a vehicle body is inserted; and a latch fork rotatably installed in the frame part and configured to open or close the opening so as to restrict or release the striker within the opening; and the frame part may include a steel plate configured to allow at least one portion of the latch fork to be insertion-fitted thereinto to support the latch fork in forward and rearward directions of a vehicle, when the latch fork closes the opening, thereby stably fixing the latch fork and the striker.

9 Claims, 19 Drawing Sheets

SEATBACK LOCKING DEVICE

CROSS REFERENCE TO RELATED APPLICATION

The present application claims priority to Korea Patent Application No. 10-2023-0169573, filed Nov. 29, 2023, the entire contents of which is incorporated herein for all purposes by this reference.

FIELD

The present disclosure relates to a seat-back locking device, and more particularly, to a seat-back locking device supported on a frame part when a latch fork restricts a striker, and fixing a striker stably.

BACKGROUND

Seats include a seat cushion to support the passenger's hips, a back rest to support the passenger's back, and a head rest to support the passenger's head. In particular, seat backs configuring the back rest and the head rest are formed to be foldable with respect to seat cushions, thereby an interior space at rear seats can be expandable.

In FIG. 1, a conventional seat-back locking device is schematically illustrated. Referring to FIG. 1, a striker 2 is installed on an inside of a vehicle 1, and a seat back 3 may have a lever 4 provided on an upper portion of the seat back 3 to be pulled or pressed, and a latch 5 installed in the seat back 3 to be operated according to the lever 4 and to be locked or released along with the striker 2.

The latch 5 has a locking part capable of being coupled to the striker 2 mounted on an inside of the vehicle 1, and may restrict or release the striker 2 according to the operation of the lever 4. When the latch 5 is separated from the striker 2, the seat back 3 becomes rotatable and the seat back 3 may be foldable with respect to the seat cushion (not illustrated).

Such a latch 5 is a multi-stage latch, includes one or more locking parts and may be provided to be capable of adjusting an angle of the seat back 3. As the striker 2 is restricted by a first locking part or a second locking part provided in the latch 5, an angle of the seat back 3 may be adjusted.

However, the conventional seat-back locking device had a problem in that a supporting force by which the latch locks the striker was insufficient, resulting in a clearance, since the latch restricted the striker using a spring force.

As such, since a clearance occurred between the locking part and the striker, the seat back moved and vibration and noise occurred due to the move of the seat back, and that might pose an inconvenience to passengers, resulting in deteriorated product reliability.

In addition, there were problems in that differences in a binding ability of the latch occurred according to assembling variation and size variation among parts, and welding variation of the striker installed in the vehicle, and a clearance between the latch and the striker occurred.

In addition, problems of rattle noise while traveling and friction noise occurred according to quality variation of parts, and bump feeling was generated when operating the seat backs due to assembling variation of the vehicle body, resulting in uncomfortableness.

In addition, since the latch, which supports the striker when a collision accident occurs, could be easily deformed and thus, the locking of the seat back could be easily released, and that might lead to a bigger accident. Therefore, there was a problem in that the safety of passengers could not be secured.

SUMMARY

The object to be achieved by the present disclosure is to provide a seat-back locking device capable of preventing deformation of the latch part thanks to a steel plate even if the separation force is generated in the striker.

In addition, the object to be achieved by the present disclosure is to provide a seat-back locking device capable of preventing separation of the striker thanks to a main plate, which secondarily supports the deformed latch part, even if the latch part is plastically deformed.

Further, the object to be achieved by the present disclosure is to provide a seat-back locking device capable of stably fixing the striker by having a structure in which the latch fork is directly insertion-fitted into the frame part, thereby fixing the latch fork in one direction.

Moreover, the object to be achieved by the present disclosure is to provide a seat-back locking device capable of allowing the seat back to be in one stage locking state, when rotating the seat back without the operation of the lever.

Furthermore, the object to be achieved by the present disclosure is to provide a seat-back locking device capable of allowing the first-stage locking state and the second-stage locking state of the seat back to be reliably performed by having a structure which restricts a position of the striker to the first-stage locking state, when rotating the seat back without the operation of the lever.

Furthermore, the object to be achieved by the present disclosure is to provide a seat-back locking device capable of solving such problems of the conventional technology described above. In more detail, the object to be achieved by the present disclosure is to provide a seat-back locking device capable of minimizing a clearance between the striker and the latch part even if the location variation of the striker, quality variation of the parts and assembling variation occur, as the latch part is provided to have a two-stage catch structure.

In addition, the object to be achieved by the present disclosure is to provide a seat-back locking device capable of reducing the conventional rattle noise and the friction noise, by minimizing a clearance between the striker and the latch part, and removing a bump feeling occurred during the operation of the seat back.

Further, the object to be achieved by the present disclosure is to provide a seat-back locking device capable of fully fixing moving between the striker and the seat back by having a damper supporting the striker in a vertical direction and left and right directions of the vehicle.

Moreover, the object to be achieved by the present disclosure is to provide a seat-back locking device capable of preventing separation of the striker due to a moment generated in a direction in which the latch fork closes an opening in the latch part, when a separation force is generated in the striker.

Technical objects to be achieved by the present disclosure are not limited to the aforementioned objects, and those skilled in the art to which the present disclosure pertains may evidently understand other technical objects from the following description.

One embodiment is a seat-back locking device, including: a frame part installed in a seat back and having an opening into which a striker fixed to a vehicle body is inserted; and a latch fork rotatably installed in the frame part and configured to open or close the opening so as to restrict or release the striker within the opening; and the frame part may include a steel plate configured to allow at least one portion of the latch fork to be insertion-fitted thereinto to support the latch fork in forward and rearward directions of a vehicle, when the latch fork closes the opening.

The frame part may include: a main plate configured to allow the opening to be formed therein; and a steel plate configured to be coupled to the main plate with the latch fork interposed therebetween, and the steel plate may have a first latch fork support and a second latch fork support spaced apart from each other in one direction, and the latch fork may be inserted between the first latch fork support and the second latch fork support to be fixed to the steel plate in one direction, when the latch fork closes the opening.

The latch fork may consist of a latch fork insert member, and a latch fork outer layer section configured to cover the latch fork insert member and having a lower rigidity than the latch fork insert member, and the latch fork may be formed as the latch fork outer layer section at which the first latch fork support and the second latch fork support contact each other is cut, and the first latch fork support and the second latch fork support may contact the latch fork insert member.

The main plate may have an outer wall portion, which is an outer periphery thereof protruding toward the steel plate, the outer wall portion may have a pair of spaced ends spaced apart from each other by a space connected to the opening, and when the latch fork is deformed by a vehicle collision, the spaced ends may support the deformed latch fork.

The frame part may further include: a latch cover having a striker insertion portion configured to allow the striker to be inserted thereinto, and at least one elastic piece protruding toward the striker; and a damper installed in the latch cover and configured to support the elastic piece toward the striker, and the steel plate may have a cover support configured to surround the striker insertion portion.

The latch fork may include: a first locking part configured to be recessed at a lower end of the latch fork and allows the striker to be inserted thereinto; a second locking part configured to be recessed at a lower end of the latch fork, spaced apart from the first locking part in a forward direction of a vehicle, and allows the striker to be inserted thereinto; and a rotation guide surface formed to be inclined on a surface exposed between the spaced ends of the first locking part and configured to rotate the latch fork when the striker is supported, and the striker may be configured to be restricted by the first locking part in a first-stage locking state, or to be restricted by the second locking part in a second-stage locking state.

The seat-back locking device may further include: an actuating element configured to rotate, and to rotate the latch fork when an external force is applied to a lever, and when a direction in which the latch fork rotates so as to open the opening is considered as one direction, the actuating element may be configured to rotate in the one direction so as to rotate the latch fork when an external force is applied to the lever, and only the latch fork may rotate in the one direction, when the striker supports the latch fork.

The actuating element may have a protrusion protruding from one side of the actuating element and configured restrict moving of the striker that moves along the opening so as to prevent the striker from moving to a second-stage locking position.

The latch fork may have a latch fin formed at a position spaced apart from the actuating element in the one direction so as to be supported on the actuating element when the actuating element rotates in the one direction.

According to the seat-back locking device of the present disclosure, there are one or more effects as below.

First, according to the present disclosure, there is an effect of minimizing a clearance between the striker and the latch part since the latch part is provided in a two stage catch structure, even if a position variation of the striker, quality variation of parts and assembling variation occur.

In addition, there is an effect of reducing uncomfortableness occurred when operating the conventional seat back since the dump feeling which used to occur during the operation of the seat back is removed and the rattle noise and the friction noise is reduced by minimizing the clearance between the striker and the latch part.

Moreover, there is an effect of fully fixing the moving between the striker and the seat back since the damper supporting the striker in a vertical direction and left and right direction of the vehicle is provided.

Also, there is an effect of preventing separation of the striker since the moment is generated in a direction in which the latch fork closes an opening when a separation force is generated in the striker.

Furthermore, there is an effect of preventing deformation of the latch part since the present disclosure provides the steel plate, even if the separation force is generated in the striker.

Also, there is an effect of securing safety of the passengers due to prevention of separation of the striker, since the present disclosure provides a main plate secondarily supporting the deformed latch part even if the latch part is plastically deformed.

In addition, there is an effect of stably securing the striker by fixing the latch fork in one direction, since the present disclosure provides a structure in which the latch fork is directly insertion-fitted into the frame part.

Also, when rotating the seat back without operating the lever, there is an effect of allowing the seat back to be in the first-stage locking state without operating the lever, since rotation of the latch part only can make the striker move to the first-stage locking position when the striker collides with the latch fork.

In addition, since the present disclosure has a protrusion and an obstruction in the lever element, there is an effect of making the operation of the first-stage locking and the second-stage locking of the seat back be made easy since the striker can be restricted at the first-stage locking position, when rotating the seat back without operating the lever.

Therefore, adjustment of the rotational angle of the seat back by the user is made easy and reliability of the product can be given to the user.

DETAILED DESCRIPTION

Figure 1:
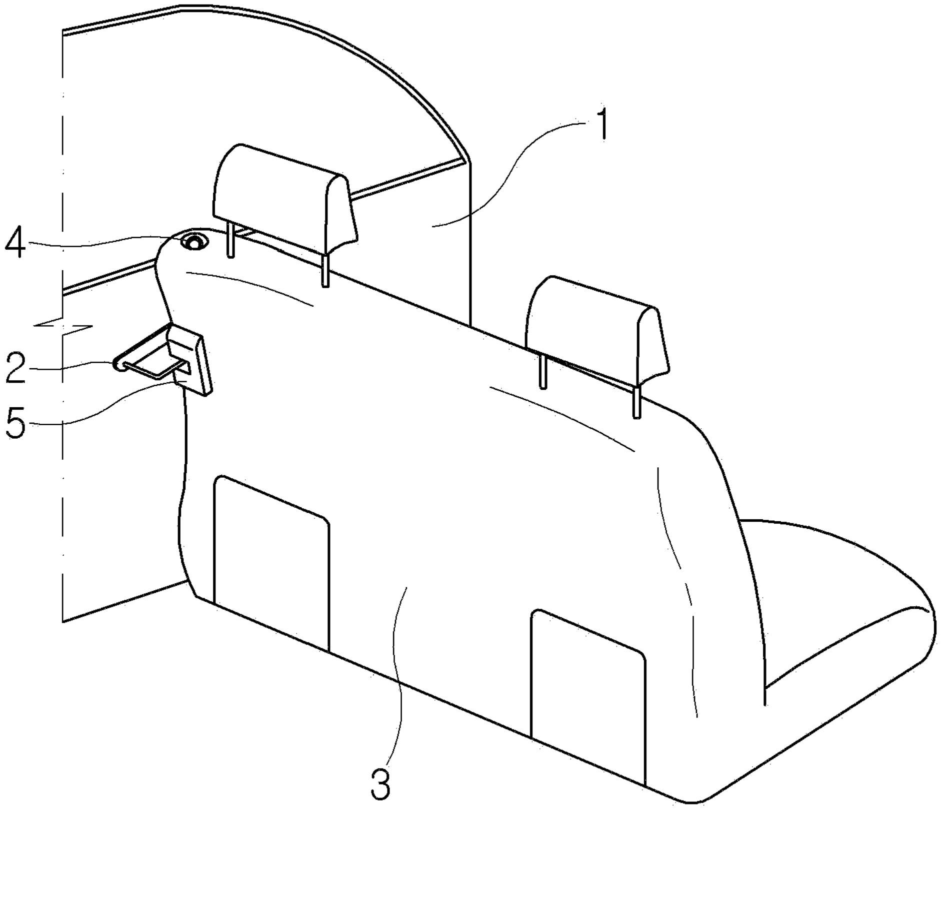
FIG. 1 is a view illustrating a state in which the conventional seat-back locking device is installed.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals generally denote like elements throughout the specification.

Figure 2:
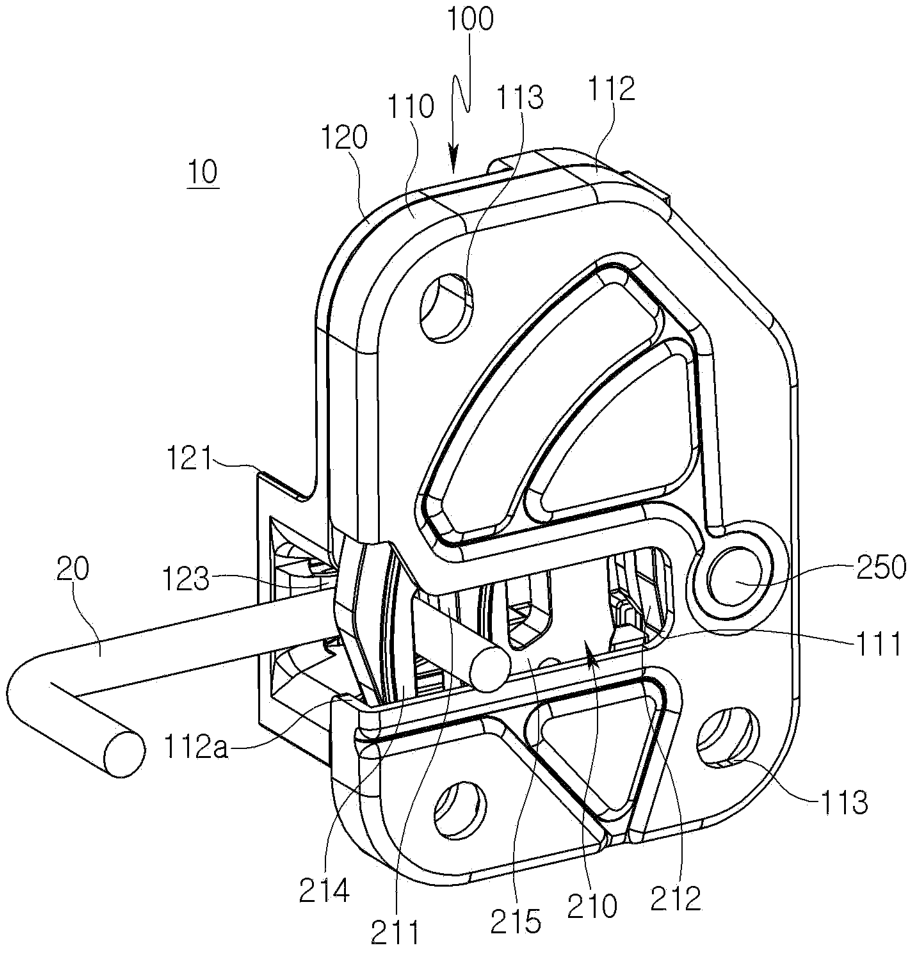
FIGS. 2 and 3 are perspective views of a seat-back locking device according to an embodiment of the present disclosure.
Figure 3:
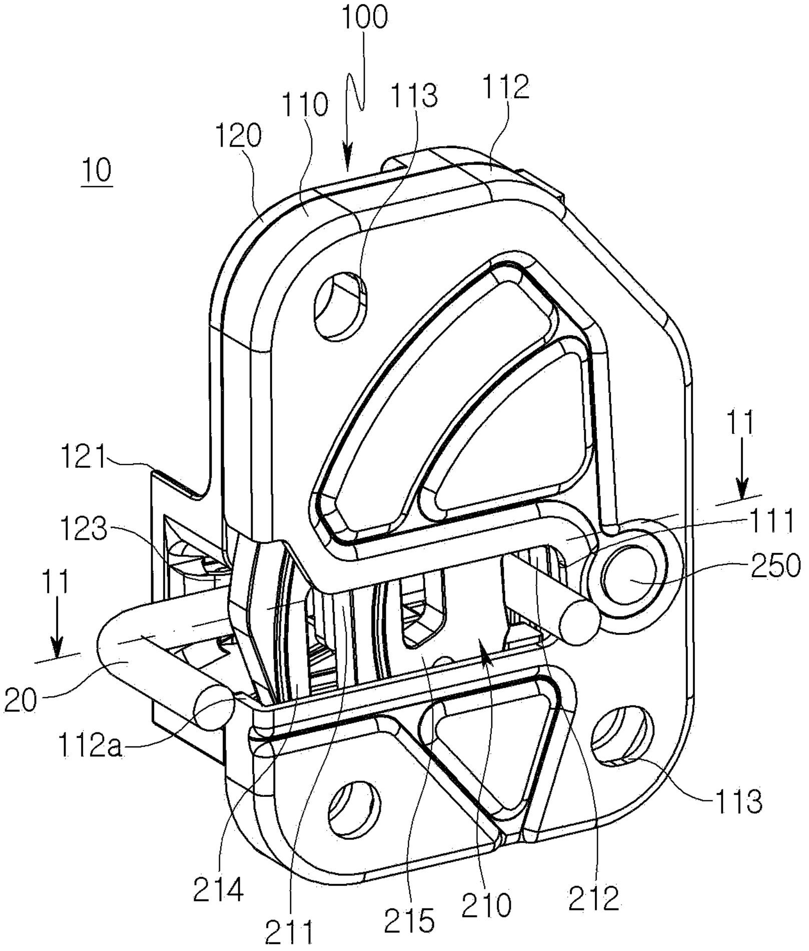
Figure 4:
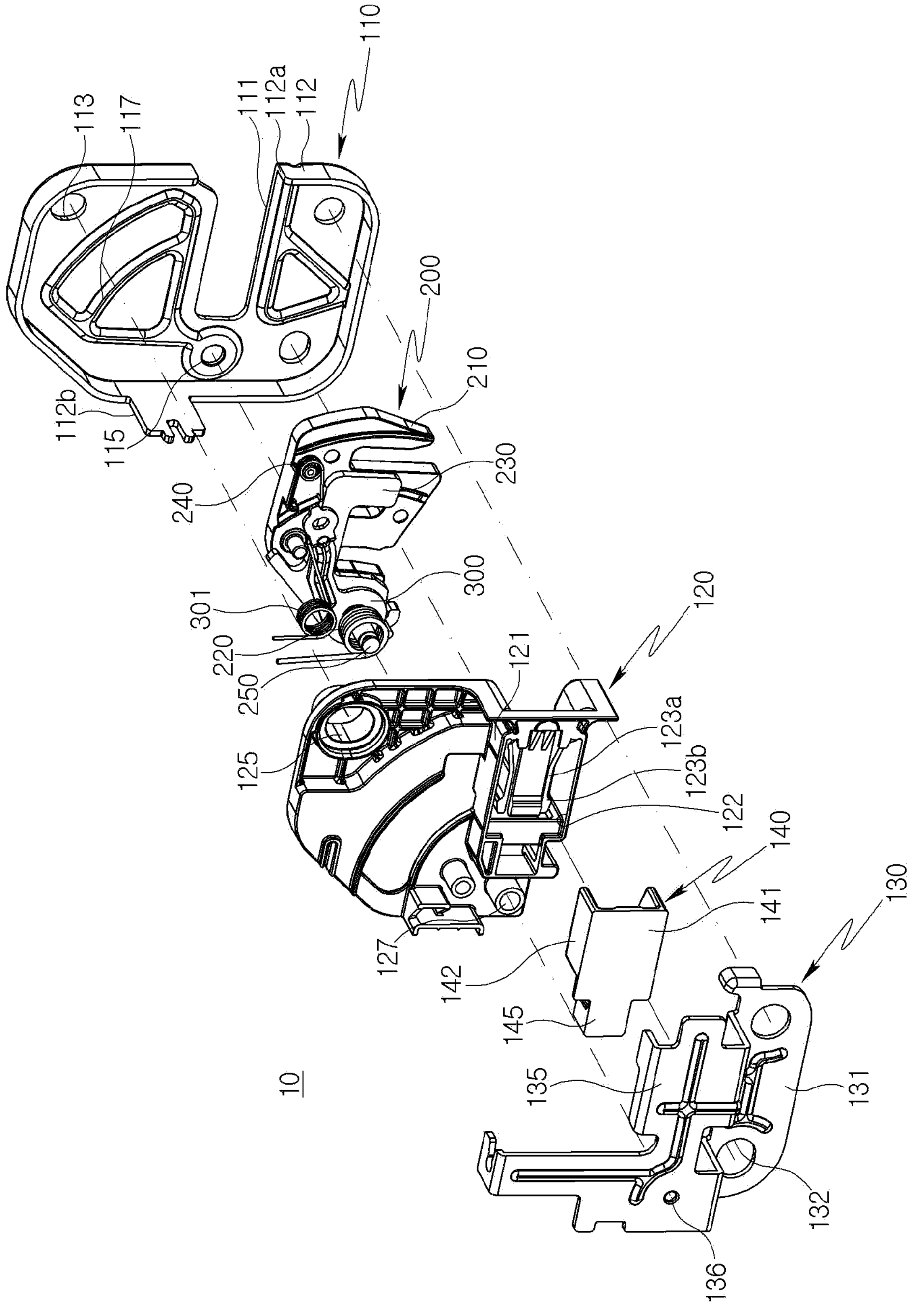
FIG. 4 is an exploded perspective view of the seat-back locking device according to an embodiment of the present disclosure.
Figure 5:
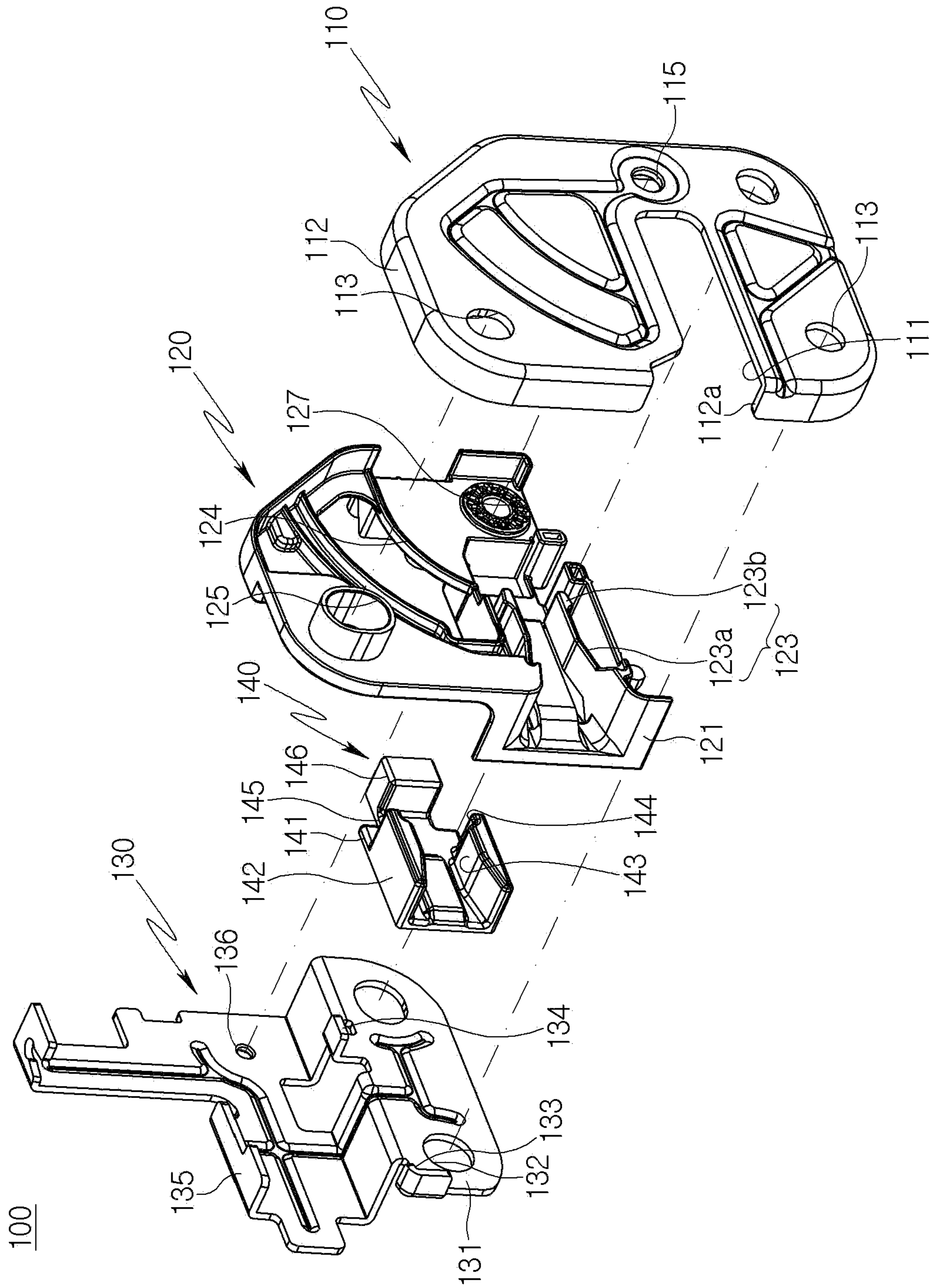
FIG. 5 is an exploded perspective view of a frame part of the seat-back locking device according to an embodiment of the present disclosure.
Figure 6:
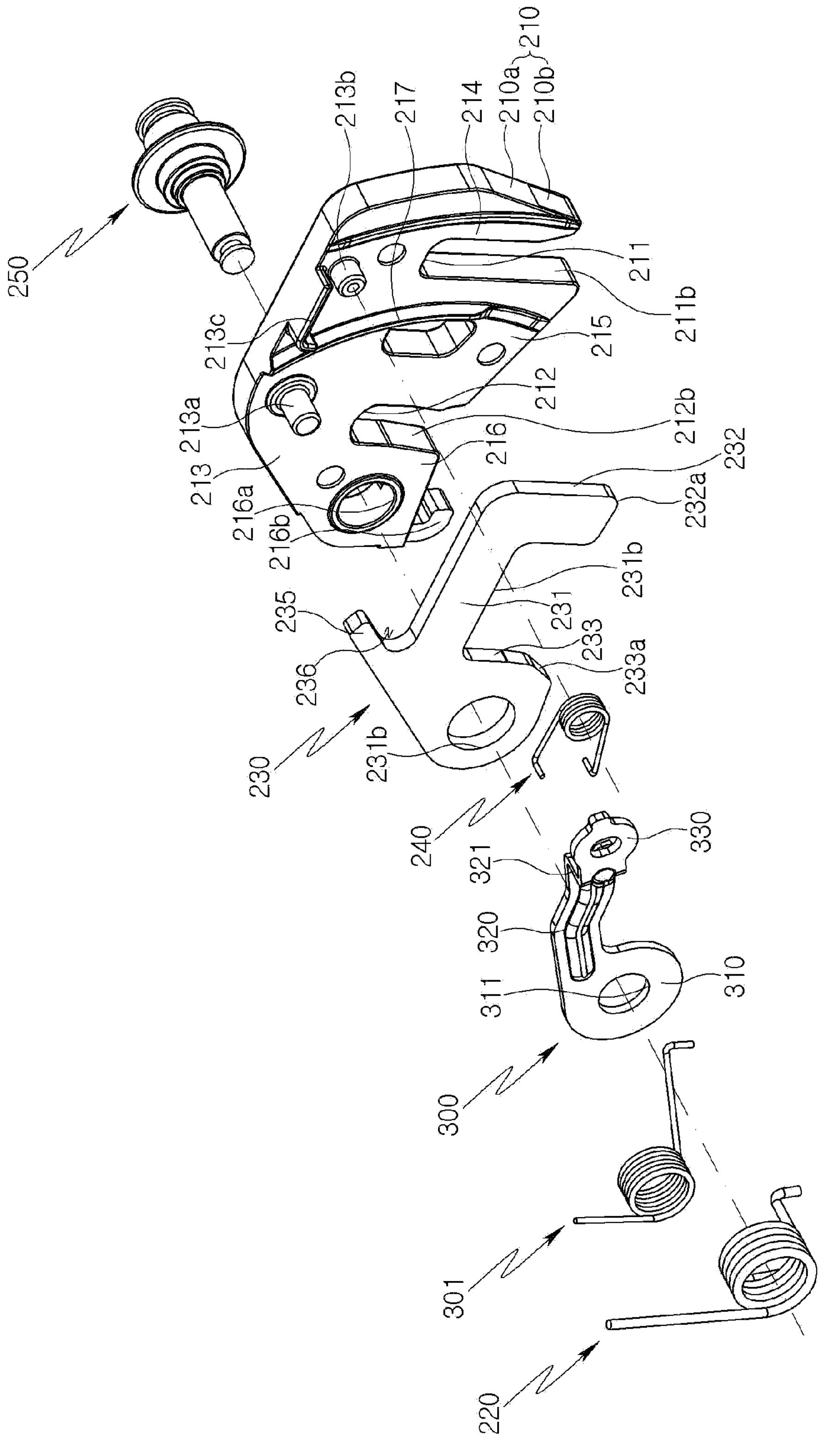
FIG. 6 is an exploded perspective view of an actuating element and a latch part of the seat-back locking device according to an embodiment of the present disclosure.
Figure 7:
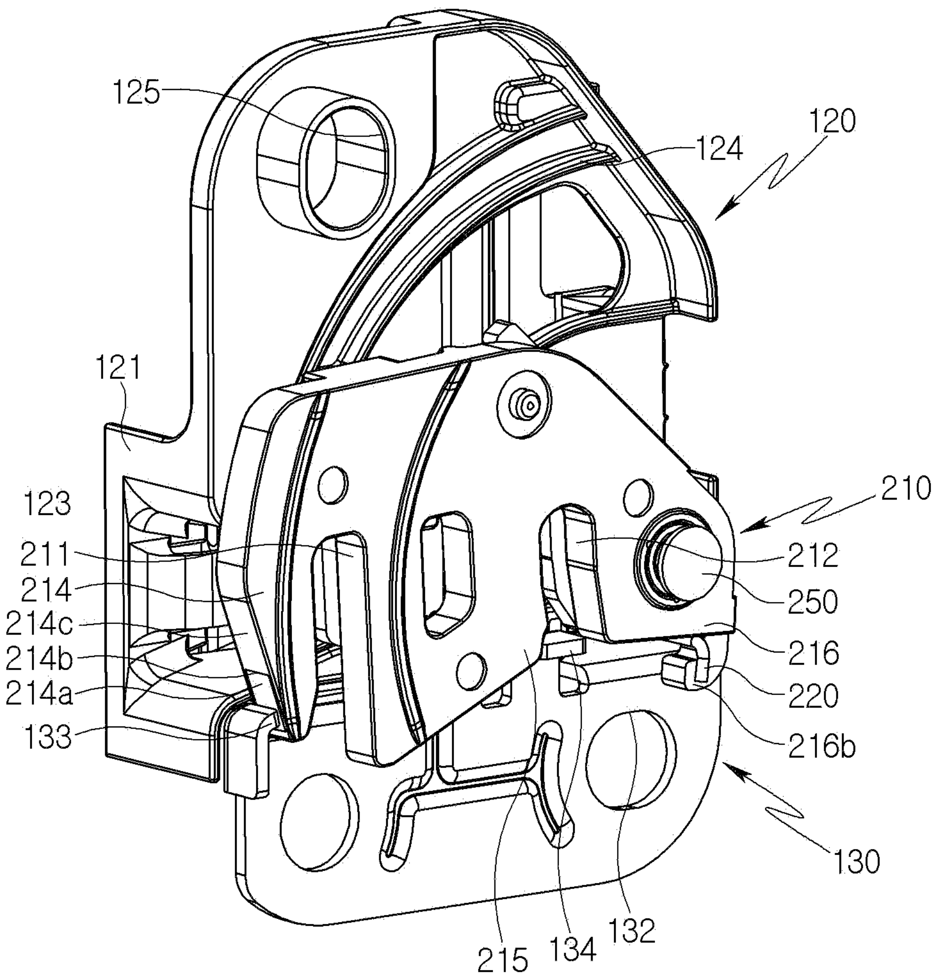
FIGS. 7 and 8 are views illustrating a state in which a latch fork is insertion-fitted into a steel plate in the seat-back locking device according to an embodiment of the present disclosure.
Figure 8:
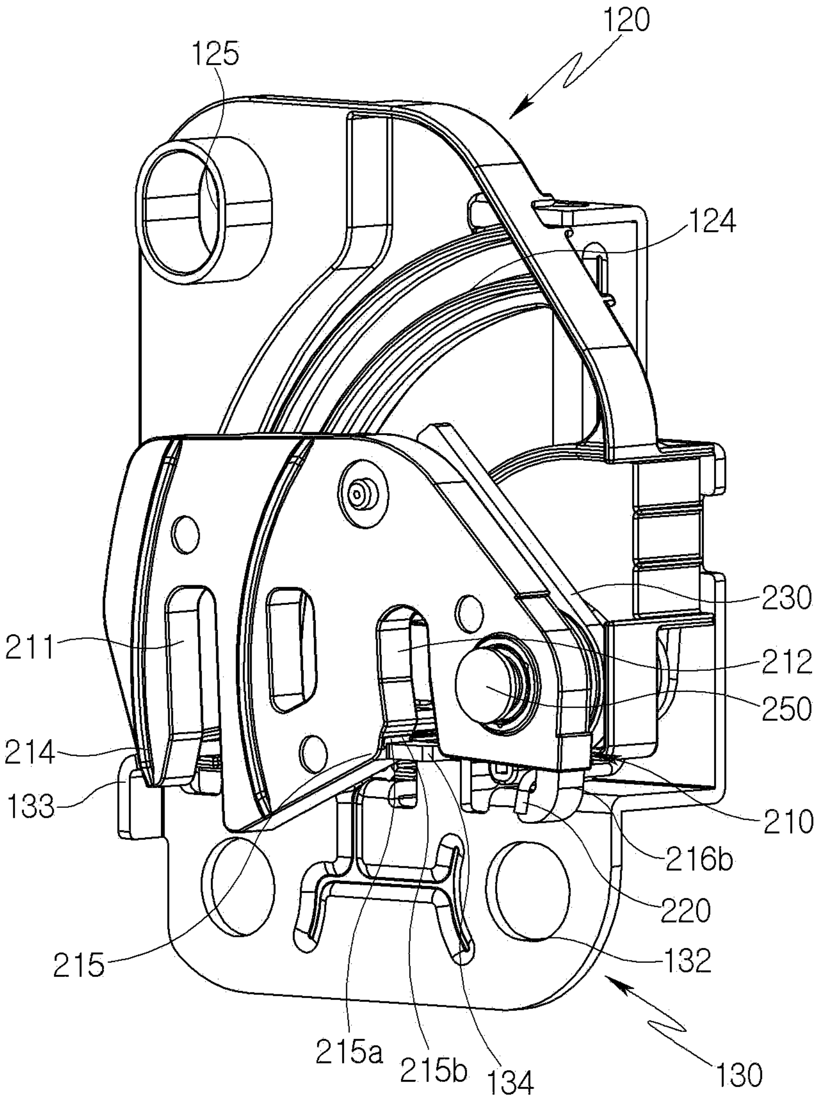
Figure 9A:
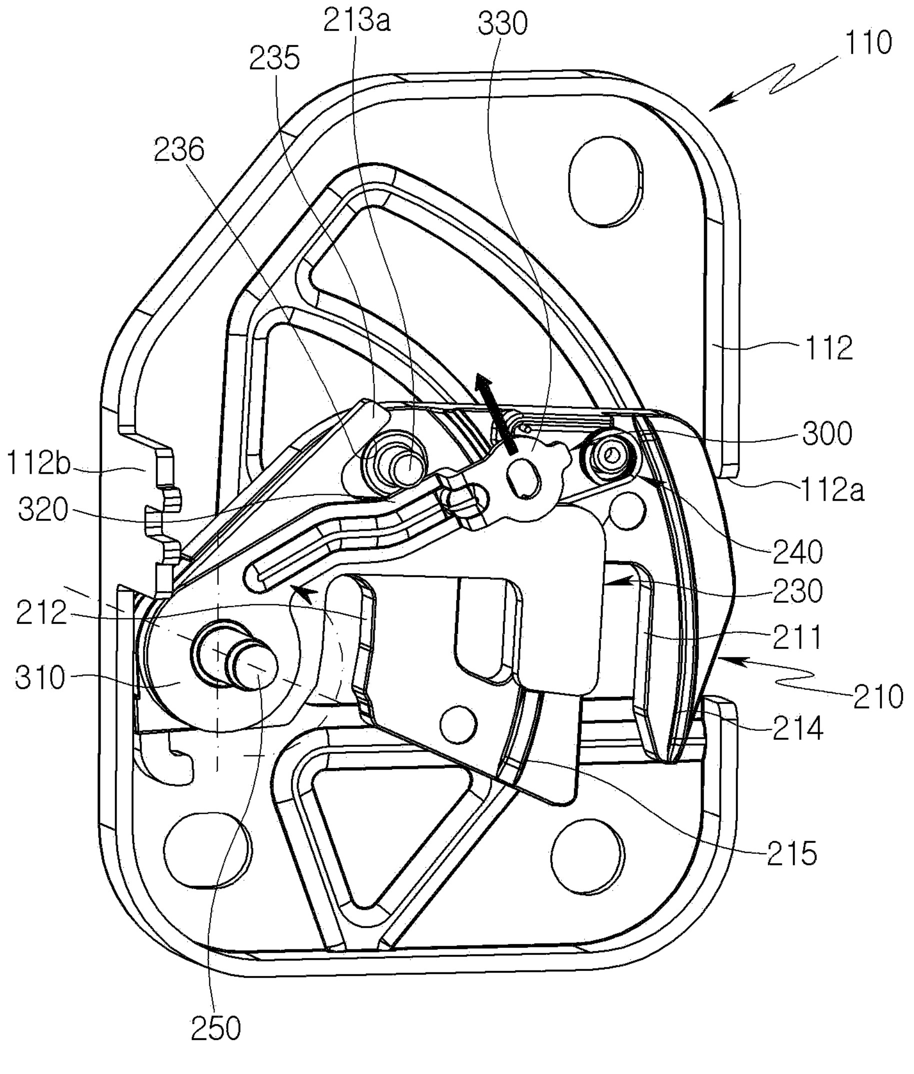
FIGS. 9*a* to 9*c* are views describing a procedure to release restriction of the seat-back locking device according to an embodiment of the present disclosure.
Figure 9B:
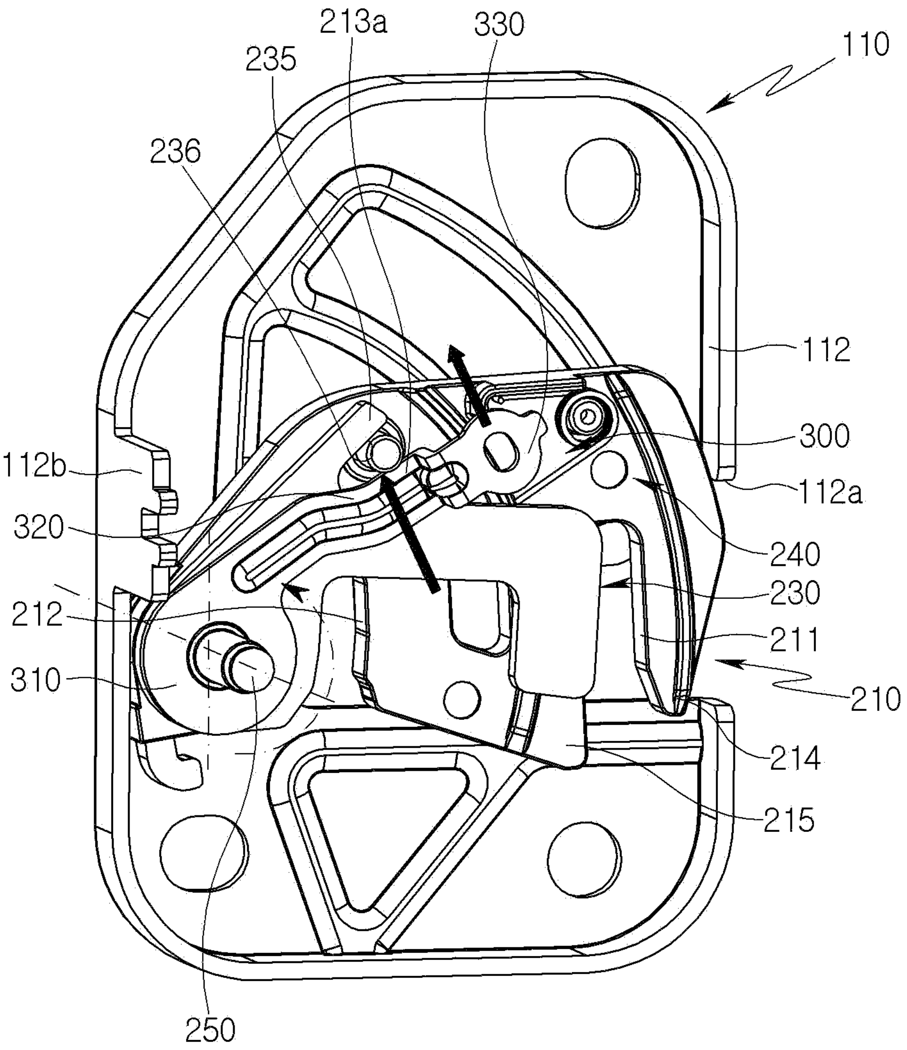
Figure 9C:
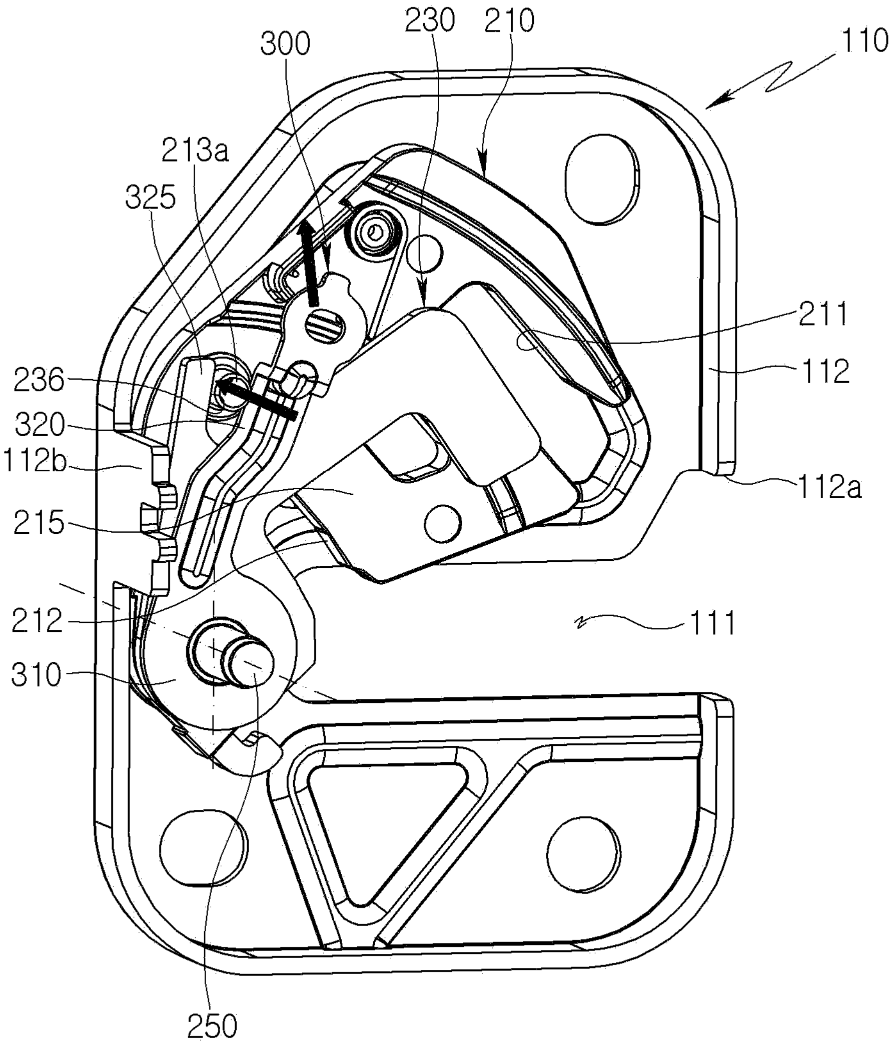
Figure 10A:
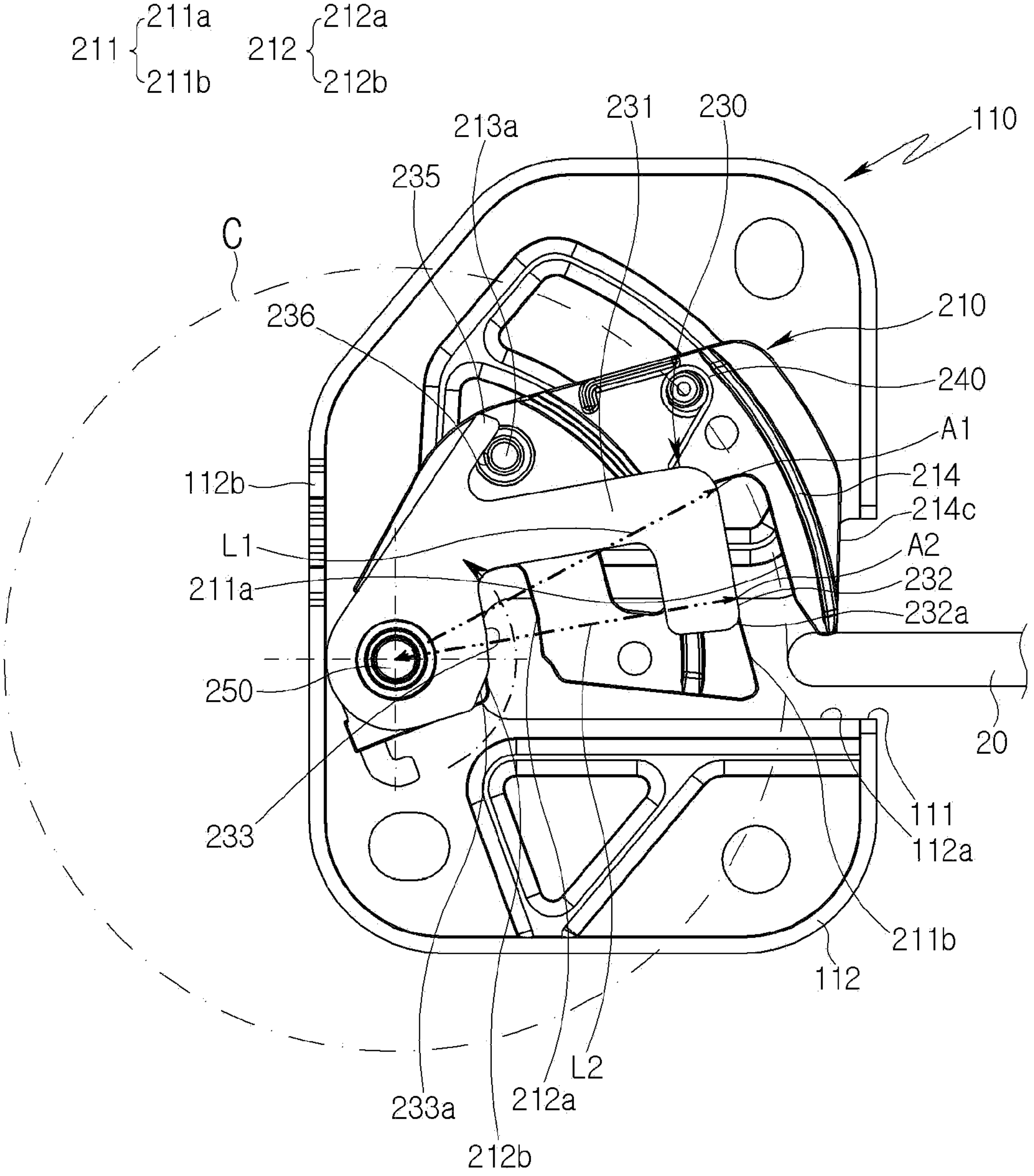
FIGS. 10*a* to 10*c* are views for describing a procedure to restrict the striker of the seat-back locking device according to an embodiment of the present disclosure.
Figure 10B:
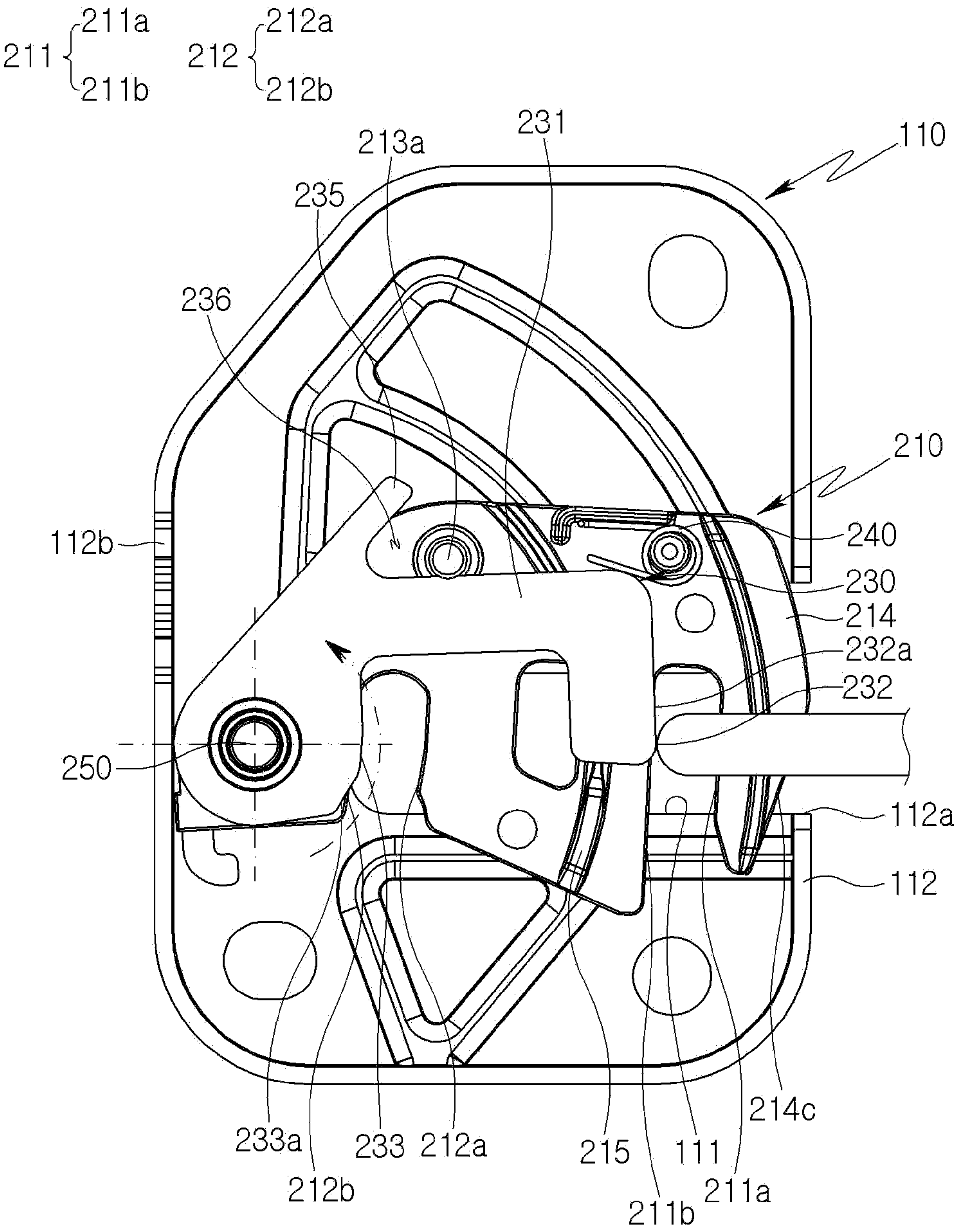
Figure 10C:
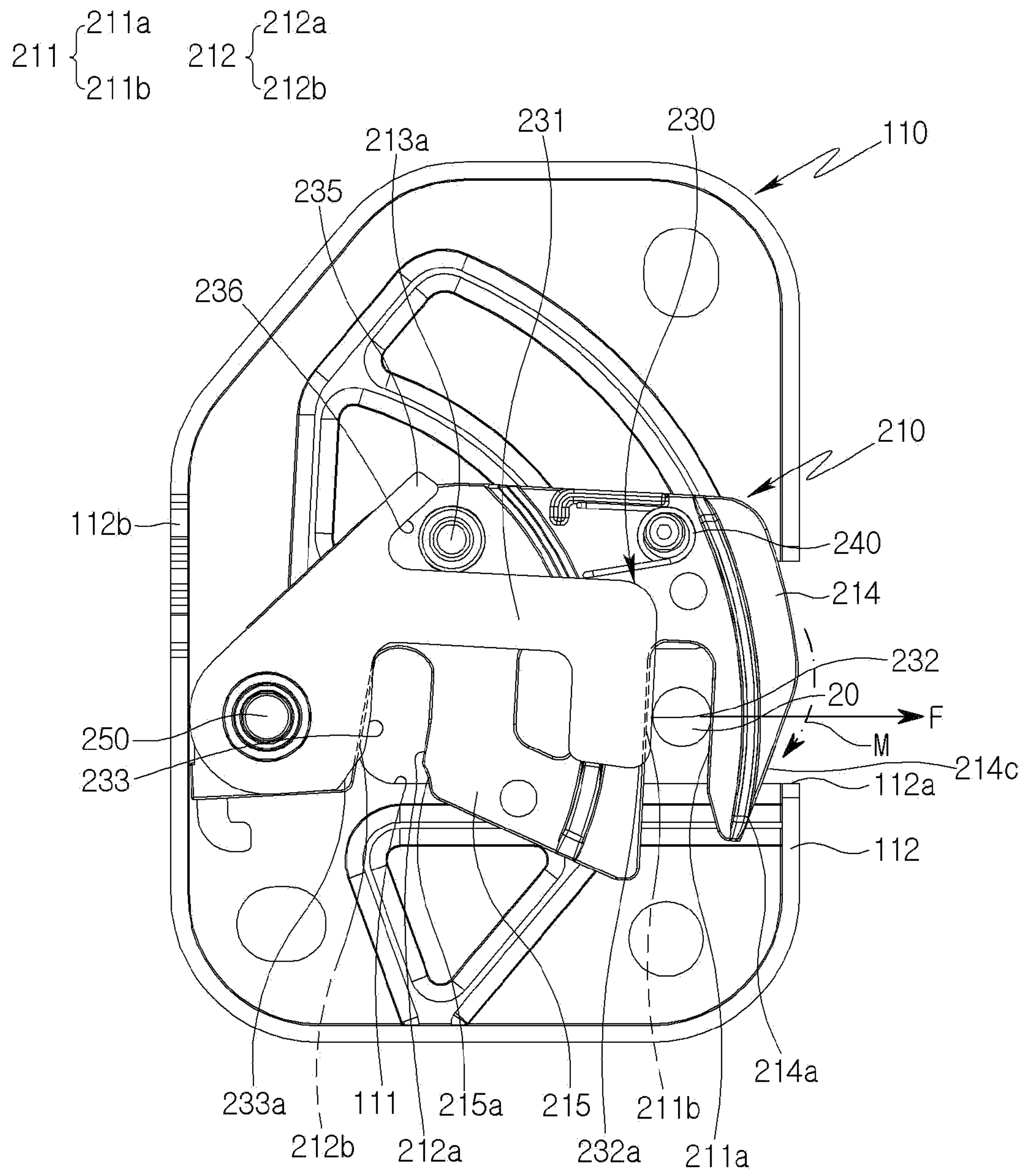
Figure 11:
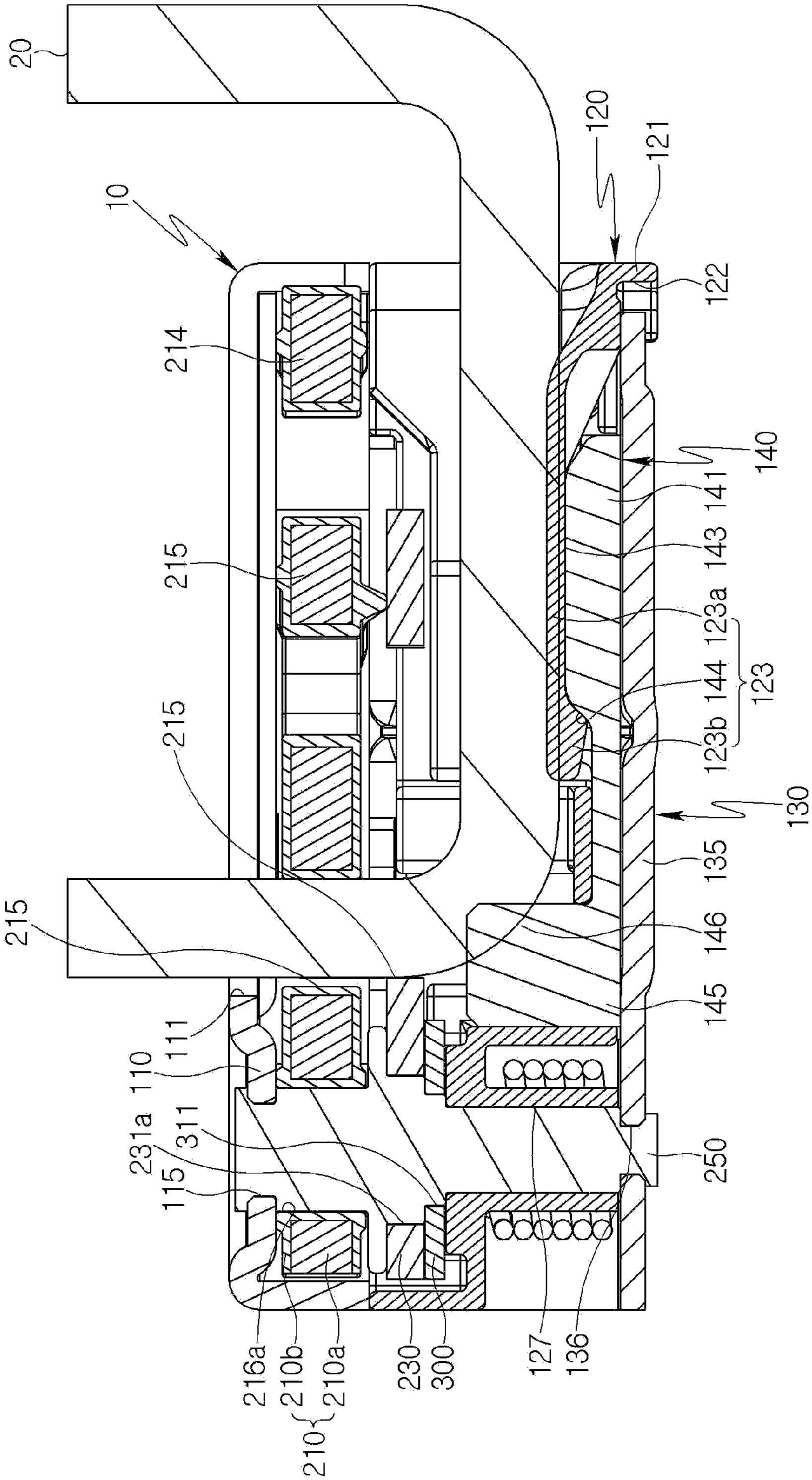
FIG. 11 is a cross-sectional view taken along line 11-11 of FIG. 3.
Figure 12:
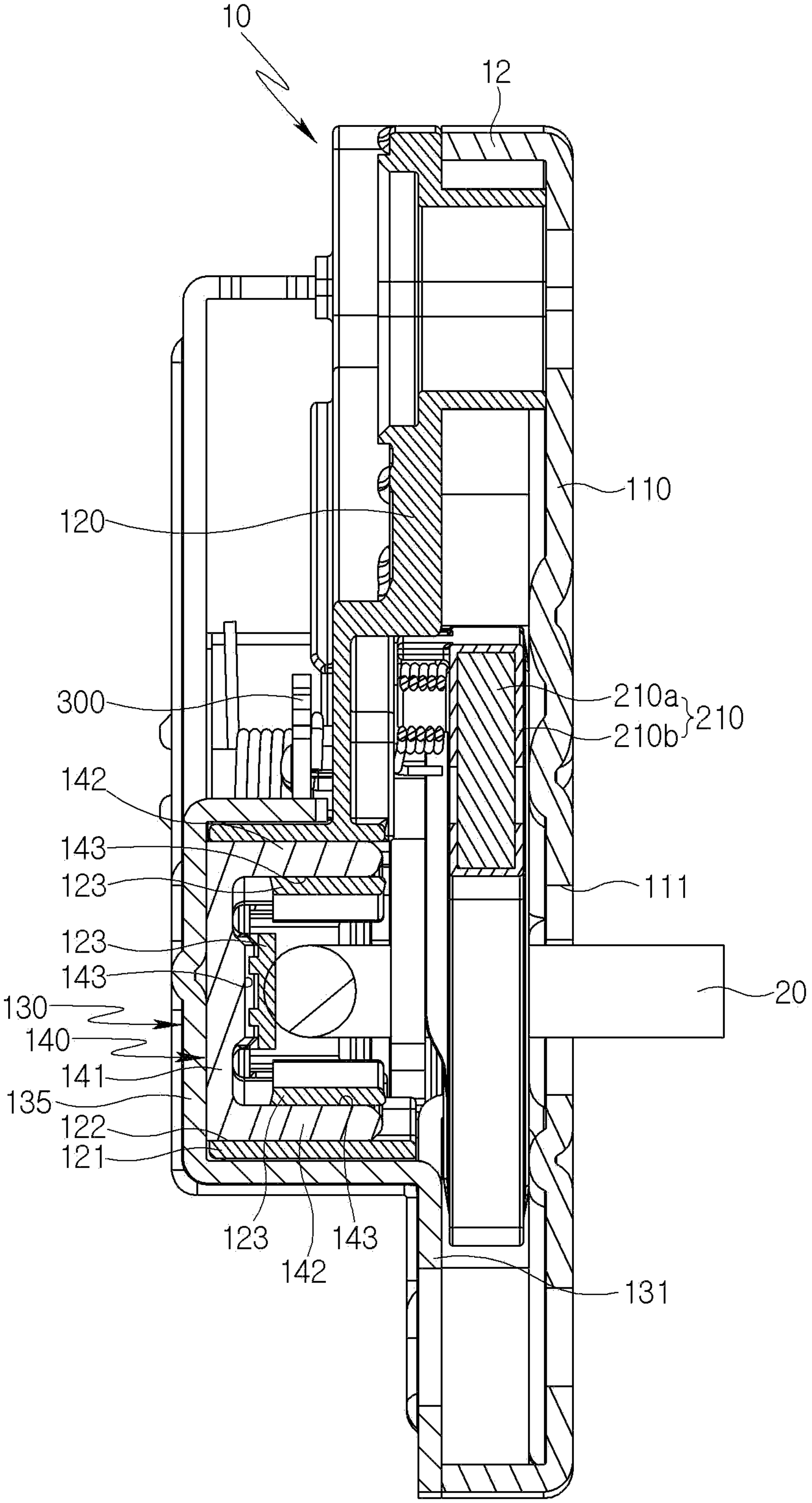
FIG. 12 is a cross-sectional view taken along line 12-12 of FIG. 11.
Figure 13:
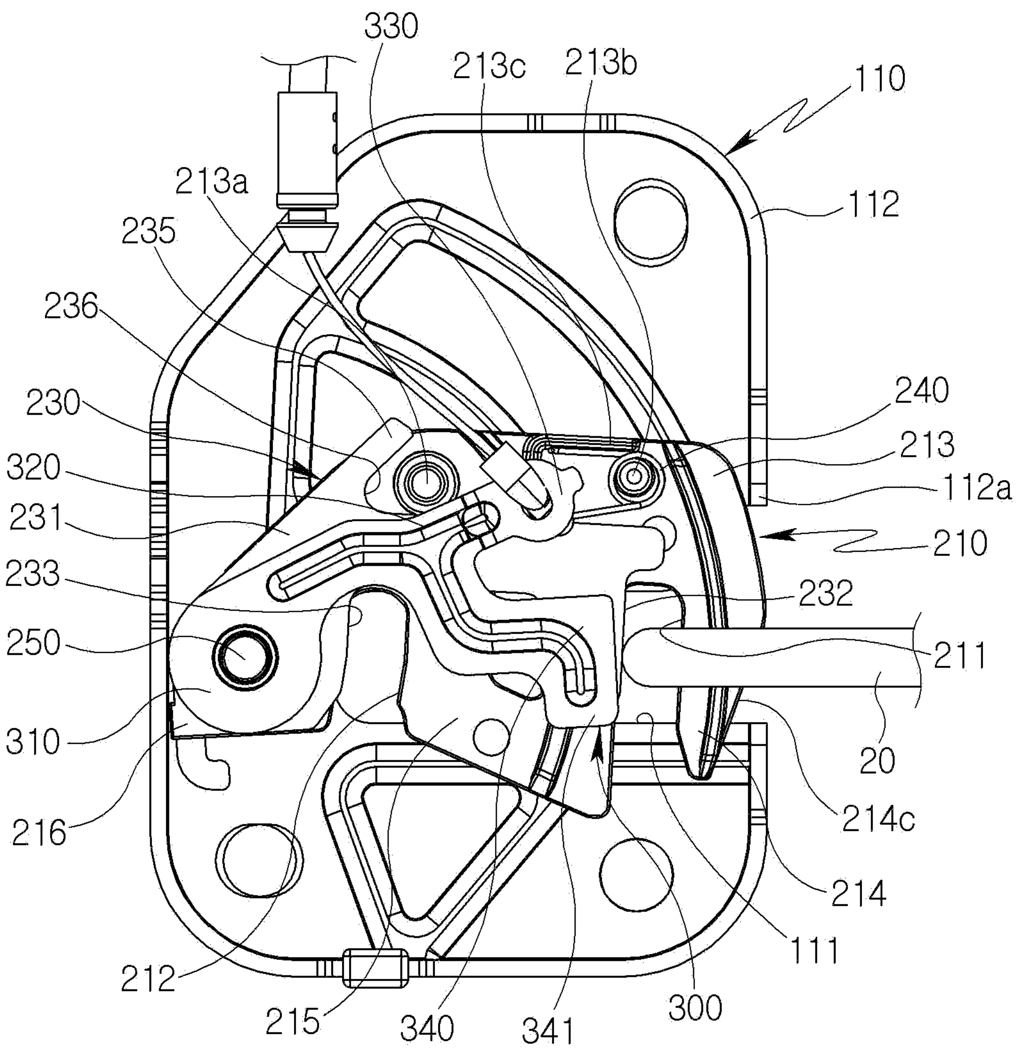
FIG. 13 is a view illustrating a restriction state of a striker of the seat-back locking device according to another embodiment of the present disclosure.
Figure 14:
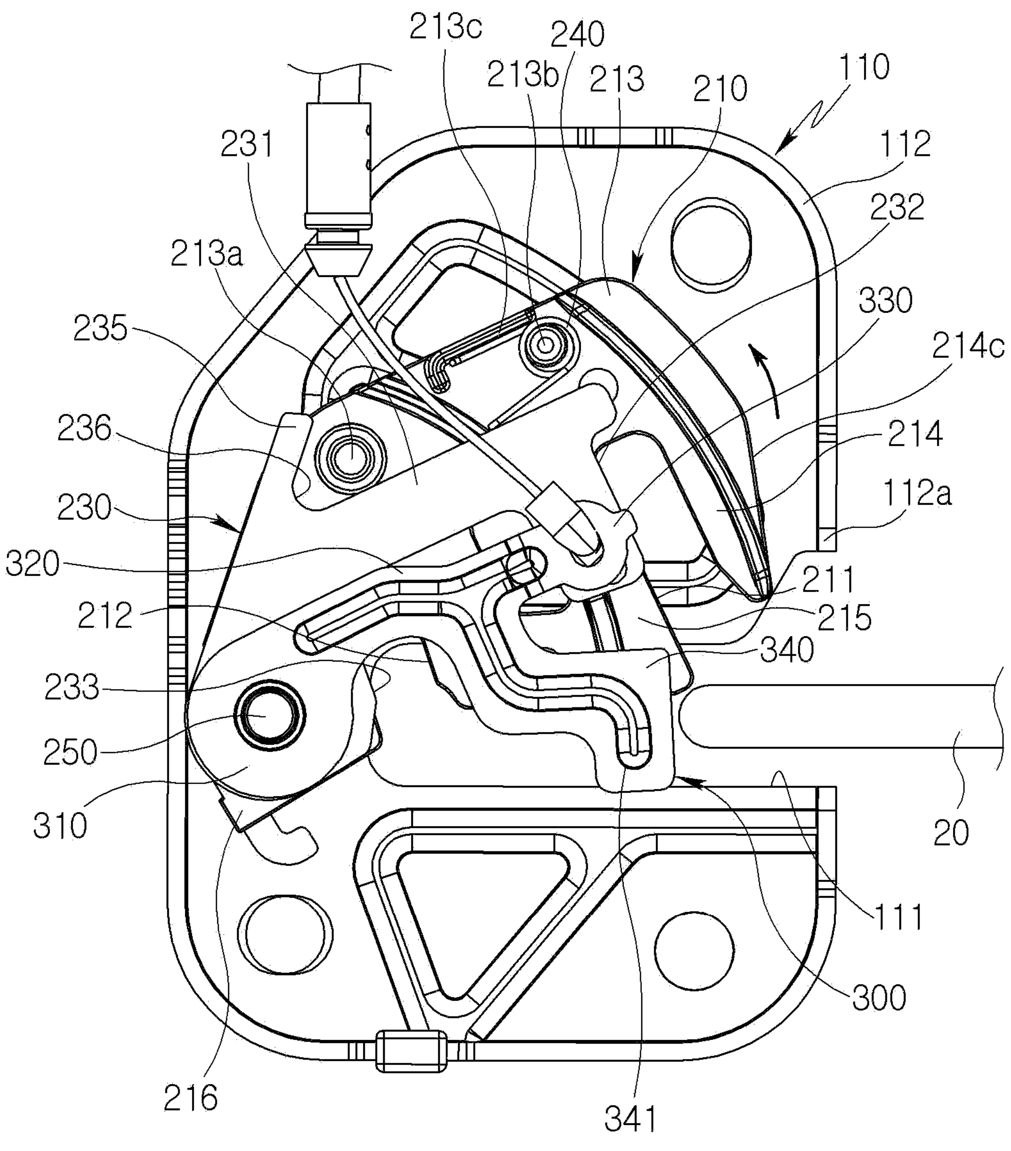
FIG. 14 is a view illustrating a procedure in which a striker of the seat-back locking device according to another embodiment of the present disclosure moves to a first-stage locking position.
Figure 15:
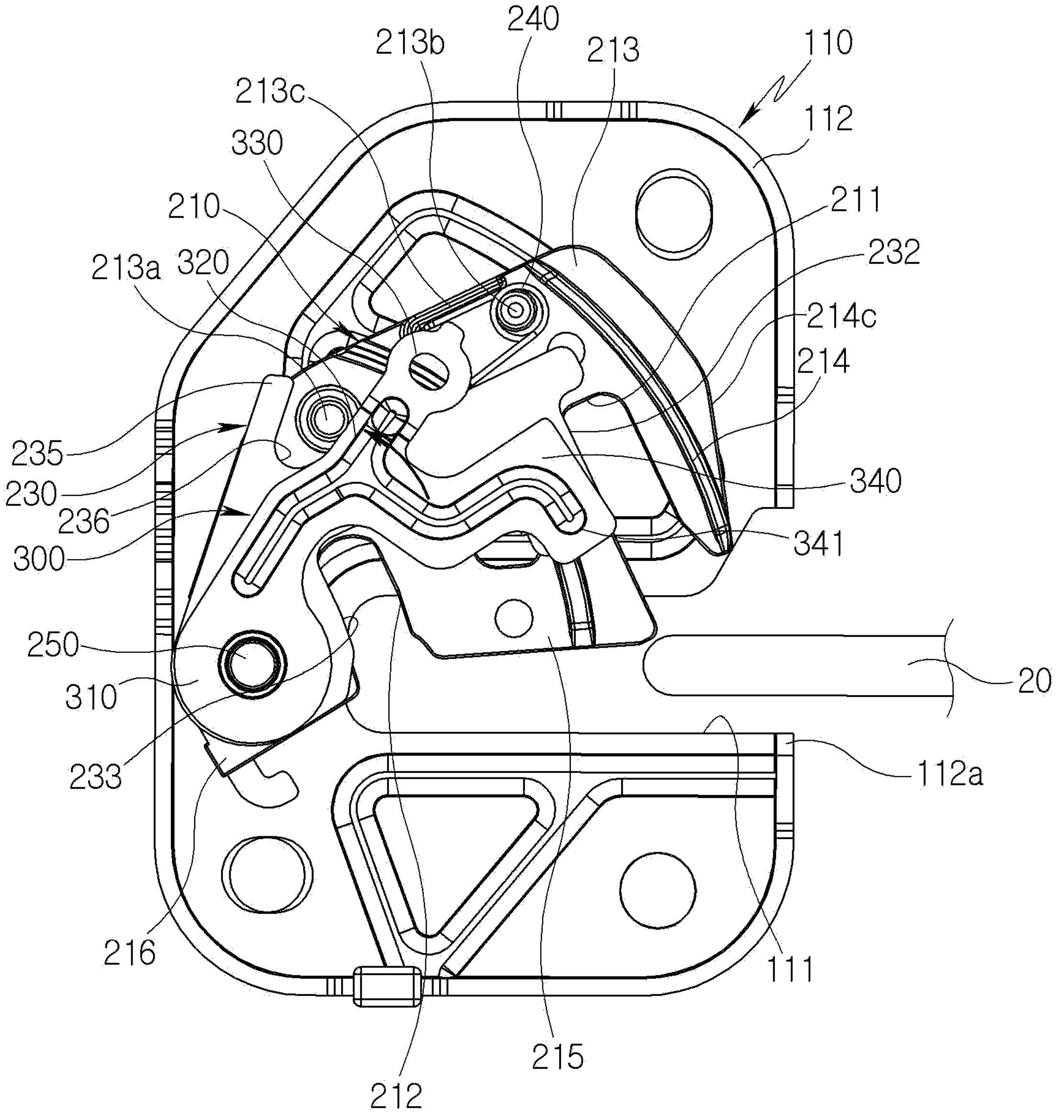
FIG. 15 is a view illustrating a procedure in which a striker of the seat-back locking device according to another embodiment of the present disclosure moves to a second-stage locking position.

Perspective views of a seat-back locking device according to an embodiment of the present disclosure are illustrated in FIGS. 2 and 3, an exploded perspective view of the seat-back locking device according to an embodiment of the present disclosure is illustrated in FIG. 4, an exploded perspective view of a frame part of the seat-back locking device according to an embodiment of the present disclosure is illustrated in FIG. 5, an exploded perspective view of an actuating element and a latch part of the seat-back locking device according to an embodiment of the present disclosure is illustrated in FIG. 6, views illustrating a state in which a latch fork is insertion-fitted into a steel plate in the seat-back locking device according to an embodiment of the present disclosure are illustrated in FIGS. 7 and 8, views describing a procedure to release restriction of the seat-back locking device according to an embodiment of the present disclosure are illustrated in FIGS. 9*a* to 9*c*, views for describing a procedure to restrict the striker of the seat-back locking device according to an embodiment of the present disclosure are illustrated in FIGS. 10*a* to 10*c*, a cross-sectional view taken along line 11-11 of FIG. 3 is illustrated in FIG. 11, a cross-sectional view taken along line 12-12 of FIG. 11 is illustrated in FIG. 12, a view illustrating a restriction state of a striker of the seat-back locking device according to another embodiment of the present disclosure is illustrated in FIG. 13, a view illustrating a procedure in which a striker of the seat-back locking device according to another embodiment of the present disclosure moves to a first-stage locking position is illustrated in FIG. 14, and a view illustrating a procedure in which a striker of the seat-back locking device according to another embodiment of the present disclosure moves to a second-stage locking position is illustrated in FIG. 15.

As illustrated in drawing above, the seat-back locking device 10 according to an embodiment of the present disclosure includes: a frame part 100 installed in a seat back and having an opening 111 into which a striker 20 fixed to a vehicle body is inserted; a latch fork 210 rotatably installed in the frame part 100 and configured to open or close the opening 111 so as to restrict or release the striker 20 within the opening 111; and a auxiliary latch rotatably 230 installed in the frame part 100 to rotate together with the latch fork 210, having a rotation clearance in a rotational direction with the latch fork 210, and configured to bring the striker 20 into close contact with the latch fork 210.

The present disclosure relates to the seat-back locking device 10, and in particular, a two-stage latch of a vehicle seat installed in the vehicle seat to fix the seat back of the vehicle seat, or adjust an angle of the seat back of the vehicle seat.

For example, a lever which is pullable is installed in the seat-back, and particularly, a lever pullable upward is installed in an upper portion of the seat-back. In addition, in a seat-back frame, a latch part 200 connected to the lever to be operated according to the operation of the lever is provided. The latch part 200 is operable according to the operation of the lever and may be coupled to the striker 20 installed in the vehicle. That is, the lever is connected to the latch part 200 through cables and the like inside the seat-back, and may be connected in a way that the actuating element 300 releases restriction of the striker 20 by pulling the lever. When the latch part 200 is separated from the striker 20 and releases the restriction of the striker 20, the seat back may be rotated or folded.

In addition, in case of the multi-stage latch, the plurality of locking parts 211 and 212, into which the striker 20 is inserted to be fixed, are provided in the latch part 200. For example, when the seat back is in the first-stage locking state, as seen in FIG. 2, the striker 20 is inserted into the first locking part 211 to be fixed. Further, the seat back rotates more and becomes in the second-stage locking state, as seen in FIG. 3, the striker is inserted into the second locking part 212 to be fixed. Since the striker 20 is inserted into the first locking part 211 or the second locking part 212 to be fixed, the seat back rotates from the folded state to be in the first-stage locking state, or rotates more from the folded state to be in the second-stage locking state, while maintaining the state in which the angle is adjusted. The present disclosure illustrates the two-stage latch structure as illustrated in FIGS. 2 and 3, however, the present disclosure is not limited thereto.

The seat-back locking device 10 according to the embodiment of the present disclosure may include the frame part 100, the latch part 200, and the actuating element 300.

Referring to FIGS. 4 and 5, the frame part 100 may provide a space installed in the seat back frame of the seat back that allows the latch part 200 and the actuating element 300 to operate on an inside thereof, and may be provided to absorb impact transferred through the striker 20. The frame part 100 may include a main plate 110, a latch cover 120, and a steel plate 130.

The main plate 110 and the steel plate 130 may be formed of a material having high strength and rigidity so as to secure the strength and rigidity of the seat-back locking device 10. For example, the main plate 110 and the steel plate 130 may be formed of a metal material such as steel, but are not limited thereto. In particular, the main plate 110 and the steel plate 130 may prevent deformation of adjacent parts and clearances between parts, thereby preventing damage to parts and separation of the striker 20 in the vehicle collision. In addition, for example, the latch cover 120 may be injection molded, and may absorb position variation of the striker 20 or quality variation of parts, but is not limited thereto.

The main plate 110 is installed on the striker 20 side, and the latch part 200 and the actuating element 300 are disposed between the main plate 110 and the latch cover 120. In addition, the main plate 110 has a space between the main plate 110 and the steel plate 130 for allowing at least a portion of the actuating element 300 to be insertion-fitted thereinto.

The main plate 110 may be formed in a shape of a plate covering the latch cover 120 and the steel plate 130, and has an outer wall portion 112 and an opening 111 into which the striker is inserted.

The outer wall portion 112 may be formed in a way that an outer periphery of the main plate 110 protrudes toward the steel plate 130, and may be formed to cover at least a portion of the latch cover 120 and the steel plate 130. The outer wall portion 112 may be formed along a periphery of the main plate 110, and have an interval space formed by cutting a portion of the periphery of the main plate 110, at a position corresponding to the opening 111. The outer wall portion 112 has spaced ends 112*a* spaced apart from each other since a portion thereof is cut, and the striker 20 may be inserted into a portion between the spaced ends 112*a*. The spaced ends 112*a* may support the deformed latch fork 210 when the latch fork 210 is deformed in the vehicle collision, preventing the separation of the striker and thus, the rotation of the seat back.

In addition, the outer wall portion 112 may have a protruding wall portion 112*b*, which is a portion of the outer wall portion 112 protruding toward the steel plate 130 and supporting one sides of the latch cover 120 and the steel plate 130. The protruding wall portion 112*b* may be disposed at a position opposing to the spaced ends 112*a*, and requires the latch cover 120 and the steel plate 130 to be aligned at positions with respect to the main plate 110 before the assembly.

The opening 111 may be formed in a way in that a portion at the rear of the main plate 110 is cut by a certain length along forward and rearward directions of the vehicle, and is formed to be opened toward the rear of the vehicle so that the striker 20 can be inserted into the opening 111. That is, when rotating and moving the seat back rearward, the striker 20 is inserted into the opening 111.

In addition, the main plate 110 may have a plurality of first fastening holes 113. A fastening member (not illustrated) is coupled to the latch cover 120 together with one of the plurality of first fastening holes 113 to combine the main plate 110 and the latch cover 120, and installs the main plate 110 and the latch cover 120 in the seat-back frame. In addition, the fastening member is coupled to the steel plate 130 together with the rest of the plurality of first fastening holes 113 to combine the main plate 110 and the latch cover 120, and installs the main plate 110 and the latch cover 120 in the seat-back frame.

In addition, the main plate 110 has a first coupling hole 115 to which a supporting member 250 is coupled.

In addition, the main plate 110 may have at least one contact rib 117 formed along a rotational direction of the latch fork 210 so as to reduce friction with the latch fork 210 during a rotation of the latch fork 210 on an inside. The contact rib 117 protrudes toward the steel plate 130 from the main plate 110, and supports the latch fork 210.

The steel plate 130 is disposed on the seat-back frame side, and may include the plate coupling portion 131, which is coupled to the main plate 110, and a cover supporting portion 135 supporting the latch cover 120.

The steel plate 130 is coupled to the main plate 110, and fixes the latch cover 120 between the steel plate 130 and the main plate 110, thereby preventing excessive deformation and damage of the latch cover 120.

In the plate coupling portion 131, a plurality of third fastening holes 132, to which fastening members are coupled, are formed, and is disposed to be opposing to the main plate 110, with a space, into which the latch fork 210 to be described later is inserted, formed between the plate coupling portion 131 and the main plate 110.

The plate coupling portion 131 has a pair of latch fork supports 133 and 134, which protrude toward the main plate 110 to support the main plate 110, and spaced apart from each other in forward and rearward directions of the vehicle.

The plate coupling portion 131 has a first latch fork support 133 and a second latch fork support 134 spaced apart from each other in one direction, and here, the one direction refers to the forward and rearward direction of the vehicle. Therefore, a space, into which the latch fork 210 is inserted, is formed between the first latch fork support 133 and the second latch fork support 134. Such first latch fork support 133 and the second latch fork support 134 may be disposed adjacent to the opening 111 without protruding toward the inside of the opening 111. In addition, the latch fork supports 133 and 134 may be disposed adjacent to a portion of the plate coupling portion 131, which is connected to a cover support 135.

The cover support 135 may be formed to be connected to an end of the plate coupling portion and to cover a striker insertion portion 121 to be described later. For example, the cover support 135 may protrude toward the seat-back frame from an upper portion of the plate coupling portion 131 and then, may protrude again toward the upper portion thereof. In addition, at least a portion of the cover support 135 is formed to cover the striker insertion portion 121 and the rest thereof is formed to support one surface of the latch cover 120.

Further, the cover support 135 may have a first coupling hole 115, and a third coupling hole 136 formed at a position opposing to the first coupling hole 115, and allows the supporting member 250 to be coupled thereto.

The latch cover 120 has at least a portion thereof disposed between the main plate 110 and the steel plate 130 to be fixed therein, and provides a space in which the latch part 200 is installed between the latch cover 120 and the main plate 110.

The latch cover 120 may have the striker insertion portion 121 so as to provide a space, into which the striker 20 is inserted, along with the opening 111. The latch cover 120 has the striker insertion portion 121, which is a portion of the latch cover 120 protruding toward the seat back. The striker insertion portion 121 may be formed in a shape of a box opened toward the main plate 110, and rearward of the vehicle, and a portion opened toward the main plate 110 may be formed to correspond to the opening 111.

The striker insertion portion 121 may also be formed to be opened toward the steel plate 130, and may have a damper insertion portion 122, into which a damper 140, to be described later, is inserted.

In addition, in the striker insertion portion 121, at least one elastic piece 123 protruding toward the striker 20 to support the striker 20 may be provided. The elastic piece 123 may serve to elastically support the striker 20 in left and right directions of the vehicle, or to elastically support the striker 20 in a vertical direction of the vehicle.

For example, the elastic piece 123 may consist of an elastic piece body 123*a* protruding from an inner side surface of the striker insertion portion 121 toward a forward direction of the vehicle, and an engagement protrusion 123*b* provided in an end of the elastic piece body 123*a* and engagedly fastened to the damper 140, to be described later.

The elastic piece body 123*a* may consist of an inclined portion protruding inward of the striker insertion portion 121 from the striker insertion portion 121 as it gets closer toward a protrusion direction, and a horizontal portion protruding horizontally along a forward direction of the vehicle from an end of the inclined portion. In addition, in the end of the horizontal portion, the engagement protrusion 123*b* is provided to be engaged with a stepped portion 144 of the damper 140.

The elastic piece 123 is deformed when the striker 20 is inserted into the striker insertion portion 121, so as to elastically support the striker 20, and may absorb a position variation or a parts variation of the striker 20. In addition, the elastic piece 123 may fix the striker 20 in left and right directions of the vehicle between the elastic piece 123 and the vehicle body, thereby minimizing a clearance in left and right directions of the vehicle between the seat-back locking device 10 and the striker 20. Further, the pair of elastic pieces 123 facing each other fix the striker 20 in a vertical direction of the vehicle, thereby minimizing a clearance in a vertical direction of the vehicle between the seat-back locking device 10 and the striker 20.

Moreover, the latch cover 120 may have at least one second fastening hole 125, to which a fastening member is coupled. Also, the latch cover 120 may have a second coupling hole 127 formed at a position opposing to the first coupling hole 115 and the third coupling hole 136, and allowing the supporting member 250 to pass therethrough. In addition, the latch cover 120 may have at least one protruding rib 124 formed along a rotational direction of the actuating element 300 so as to reduce friction with the actuating element 300 during a rotation of the actuating element 300, on its inside. The protruding rib 124 may protrude from the latch cover 120 toward the main plate 110, and may support the actuating element 300.

The damper 140 is installed in the latch cover 120, supports the elastic piece 123 toward the striker 20, and serves to absorb the position variation of the striker 20 and the assembling variation among parts.

The damper 140 may have a damper body 141 formed in a shape of a plate and inserted into the damper insertion portion 122 of the latch cover 120. The damper body 141 may have an elastic piece support 143 inserted into the damper insertion portion 122 and supporting the elastic piece 123 on one surface thereof. In addition, the damper body 141 may have an extension portion 142 having an upper portion and a lower portion, both protruding toward the main plate 110 and inserted into a portion between the striker insertion portion 121 and the elastic piece 123, and the extension portion 142 may have elastic piece supports 143 on surfaces facing the elastic piece 123.

As such, the damper 140 may have the elastic piece supports 143 protruding toward the elastic piece 123 from three surfaces opposing to the elastic piece 123. The damper 140 may have three elastic supports 143, and the stepped portion 144, which is one recessed side of the elastic piece support 143 and into which the engagement protrusion 123*b* of the elastic piece 123 is inserted. The stepped portion 144 is recessed in a shape corresponding to the engagement protrusion 123*b*, and when the elastic piece support 143 supports the elastic piece 123, the engagement protrusion 123*b* is inserted into the stepped portion 144.

Therefore, the elastic piece support 143 of the damper body 141 is disposed between the steel plate 130 and the elastic piece 123 to support the striker 20 together with the elastic piece 123, and the other surface of the damper body 141 is supported on the steel plate 130, thereby preventing excessive deformation. That is, when the striker is inserted into the striker insertion portion 121, as the elastic piece 123 is deformed, the damper 140 is compressively deformed, and the other surface of the damper 140 is supported on the steel plate 130, thereby the excessive deformation can be prevented.

In addition, the extension portion 142 of the damper 140 supports the striker 20 together with the elastic piece 123 in the vertical direction of the vehicle as the elastic piece support 143 is disposed between the striker insertion portion 121 and the elastic piece 123. In addition, the striker insertion portion 121 may be prevented from excessive deformation by the cover support 135 disposed to cover the outside.

The damper 140 may have an extension portion 145 extending toward a front of the vehicle from the damper body 141, and may have a stopper 146 protruding toward the main plate 110 from the extension portion 145. The stopper 146 may be disposed on an inside of the striker insertion portion 121 as the damper 140 is installed in the damper insertion portion 122, and may be disposed on the frontmost side on the inside of the striker insertion portion 121 to support the striker 20. That is, when the passenger rotates the seat back to the fullest in a state the lever is pulled, the striker 20 may be supported on the stopper 146. At this time, the stopper 146 is elastically deformed by the striker 20, and may restrict the seat back so as not to rotate beyond a certain angle. A stopper insertion portion, into which the stopper 146 is inserted, may be formed in the striker insertion portion 121. In addition, a thickness of the stopper 146 may be formed to be thicker than a thickness of the elastic piece support 143.

Further, the damper 140 may be formed of the same material as that of the latch cover 120 or formed of a material having lower rigidity than that of the latch cover 120.

Meanwhile, the latch part 200 and the actuating element 300 may be installed between the main plate 110 and the latch cover 120 through the supporting member 250, and may be rotatably installed in the frame part 100.

Referring to FIG. 6, the latch part 200 may include the latch fork 210 and a auxiliary latch 230, and the latch fork 210, the auxiliary latch 230, and the actuating element 300 are rotatably installed in the frame part 100 by the supporting member 250.

That is, the supporting member 250 may pass through the actuating element 300, the latch fork 210, and the auxiliary latch 230 to be installed in the frame part 100, and may support a rotation of the latch part 200 and the actuating element 300. The supporting member 250 may pass through the second coupling hole 127 of the latch cover 120 to be installed by being coupled to the first coupling hole 115 of the main plate 110 and the third coupling hole 136 of the steel plate 130.

Therefore, a rotation shaft of the latch fork 210, a rotation shaft of the auxiliary latch 230, and a rotation shaft of the actuating element 300 may correspond to one another, and may be coaxially disposed with the supporting member 250.

As such, since the latch part 200 and the actuating element 300 both rotate about the same shaft, the operating feeling is improved and the operating loss may be minimized.

In addition, in a state in which the actuating element 300 does not rotate, the latch part 200 may rotate, thereby the striker may be moved to the first-stage locking state without the lever operation and be restricted therein. Regarding this, the detail will be described later.

Further, the seat-back locking device may be disposed and assembled in the order of the main plate 110, the latch fork 210, the auxiliary latch 230, the actuating element 300, and the latch cover 120.

The actuating element 300 is provided to rotate the latch part 200 in connection with the lever. The actuating element 300 transfers an operating force of the lever to the latch part 200. The actuating element 200 is connected to the lever and is rotated when the lever is pulled, and may rotate the latch fork 210. In more detail, the actuating element 300 may rotate when the lever is pulled, and may rotate together with the latch fork 210 when being brought into contact with a latch fin 213*a* to be described later. If there is the latch fin 213*a* in a direction in which the actuating element 300 intends to rotate, the actuating element 300 may rotate together with the latch fork 210 while supporting the latch fin 213*a*.

The actuating element 300 may consist of a rivet connecting portion 310 rotatably installed in the supporting member 250, a lever connecting portion 330 connected to the lever, and a fin pressing portion 320 provided to connect the rivet connecting portion 310 and the lever connecting portion 330.

In the rivet connecting portion 310, a third through hole 311 allowing the supporting member 250 to pass therethrough and to be inserted thereinto is formed, and the fin pressing portion 320 is integrally connected on one side thereof.

The fin pressing portion 320 is spaced apart from the latch fin 213*a* to be described later, and is provided to rotate the latch fork 210 by supporting the latch fin 213*a* while the actuating element 300 rotates. Since the latch fin 213*a* is provided at a position spaced apart in one direction from the actuating element 300, when the actuating element 300 rotates in one direction, the latch fork 210 may be rotated in one direction by the actuating element 300. In addition, both ends of the fin pressing portion 320 may be integrally connected to the rivet connecting portion 310 and the lever connecting portion 330.

The lever connecting portion 330 may be provided in an end of the fin pressing portion 320, and a cable connected to the lever may be connected thereto. At this time, the actuating element 300 is disposed between the latch cover 120 and the main plate 110, and the lever connecting portion 330 may be disposed at a position opposite to a position facing the main plate 110 of the latch cover 120. The lever connecting portion 330 may pass through an aperture formed in the latch cover 120 to be stepped from each other with the rivet connecting portion 310 and may be connected to the lever at a position opposite to a position facing the main plate 110 of the latch cover 120. In addition, an elastic member installing portion 321 disposed between the fin pressing portion 320 and the lever connecting portion 330, vertically respectively, and making the fin pressing portion 320 and the lever connecting portion 330 be stepped from each other may be provided. One end of the actuating element elastic member 301 to be described later is fixed to the elastic member installing portion 321.

The actuating element 300 may include the actuating element elastic member 301 configured to return the actuating element 30 to its original position when the operating force is removed. That is, the actuating element 300 is configured to deform the actuating element elastic member 301 while rotating when the lever is operated by an external force, and to return to its original position as the actuating element elastic member 301 is restored when the external force disappear.

The actuating element elastic member 301 is installed on the frame part 100 side and is compressively deformed when the actuating element 300 rotates. For example, a body of the actuating element elastic member 301 may be installed in the latch cover 120, and one end thereof may be fixed to the actuating element 300, and the opposite end thereof may be fixed to the latch cover 120. The actuating element elastic member 301 may be a coil spring, and a body thereof may be wound on one portion of the latch cover to be installed in the latch cover 120.

The latch fork 210 is provided to restrict the striker 20 within the frame part 100 or release the restriction. The latch fork 210 is rotatably installed in the frame part 100, and opens or closes the opening 111 to restrict the striker 20 within the opening 111 or release the restriction. In more detail, the latch fork 210 closes the opening 111 to restrict the striker 20, and opens the opening 111 to release the restriction of the striker 20. In addition, the latch fork 210 has at least one locking parts 211 and 212, into which the striker 20 is inserted.

The latch fork 210 has a latch fork body 213 formed in a shape of a plate. The latch fork body 213 has at least one locking parts 211 and 212, which is a portion of a lower portion thereof cut by a certain length. In the present disclosure, a multi-stage latch structure is described, and as illustrated in the drawings, the present disclosure is described based on a configuration in which the first locking part 211 and the second locking part 212 are provided in the latch fork body 213.

The latch fork body 213 has the first locking part 211 and the second locking part 212, and thus a first fork portion 214, a second fork portion 215, and a third fork portion 216 are provided therein. That is, the first locking part 211 is disposed between the first fork portion 214 and the second fork portion 215, and the second locking part 212 is disposed between the second fork portion 215 and the third fork portion 216.

In case the striker 20 is inserted into the first locking part 211, the striker 20 is restricted within the opening 111 as seen in FIG. 2, and in case the striker is inserted into the second locking part 212, the striker is restricted within the opening 111 as seen in FIG. 3.

In addition, an interval between the first fork portion 214 and the second fork portion 215 and an interval between the second fork portion 215 and the third fork portion 216 may be formed to be greater than a diameter of a cross section of the striker That is, the first locking part 211 and the second locking part 212 both may have a clearance with the striker 20 even if the striker 20 is inserted into the first locking part 211 or the second locking part 212.

In the locking parts 211 and 212, one surfaces 211*a* and 212*a* with which the striker comes into contact and supported by pressing portions 232 and 233 to be described later are formed to be inclined. Referring to FIG. 10*c*, one surfaces 211*a* and 212*a* of the locking parts 211 and 212 are formed to be inclined so that when the striker 20 presses the one surfaces 211*a* and 212*a* of the locking parts 211 and 212 in the vehicle collision, the locking parts 211 and 212 can be deformed in a direction in which the opening 111 is closed. That is, when the striker 20 presses one surfaces 211*a* and 212*a* of the locking parts 211 and 212 as the separation force is transferred to the striker 20, the rotation may be performed more in a direction of locking the striker 20. When the separation force F by which the striker 20 intends to separate rearward from the opening 111 is applied to the one surfaces 211*a* and 212*a* of the locking parts 211 and 212, a moment M is generated in a direction in which the latch fork 210 closes the opening 111.

In addition, the first locking part 211 is disposed at a rearward position of the vehicle than the second locking part 212, and fixes the seat back in the first-stage locking state, and the second locking part 212 fixes the seat back in the second-stage locking state. The first locking part 211 is disposed on an inlet side of the opening 111, and the second locking part 212 is disposed on a relatively inner side of the opening 111. Therefore, when the striker 20 is inserted into the opening 111, the striker 20 may come into contact with or collide with the first fork portion 214. In addition, a rotation guide surface 214*c* is formed on a surface of the latch fork 210 exposed between the spaced ends 112*a* of the main plate 110. That is, on one surface of the first fork portion 214, which is the rear-most surface of the vehicle of the latch fork 210, the rotation guide surface 214*c* is formed. The rotation guide surface 214*c* is formed on one surface of the first fork portion 214, is an inclined surface that inclines forward as it gets closer to an end, and is a surface the striker 20 contacts first when the striker is inserted into the opening 111. The first fork portion 214 is formed on the rotation guide surface 214*c* and is formed to be thinner toward the end. The rotation guide surface 214*c* is formed to be inclined inward of the opening 111 toward a lower portion, and the latch fork 219 may open the opening 111 while rotating, as the striker 20 moves inward of the opening 111 while being supported on the rotation guide surface 214*c*.

The rotation guide surface 214*c* is formed on one surface of the first fork portion 214, and one surface 211*a* of the first locking part 211 is formed on the other surface of the first fork portion 214.

Meanwhile, a first through hole 216*a*, allowing the supporting member 250 to pass therethrough and to be inserted thereinto, is formed in the third fork portion 216, and the first through hole 216*a* has an elastic member supporting portion 216*b*, to which one end of the latch fork elastic member 220 is fixed.

The latch part 200 may include the latch fork elastic member 220 configured to return the latch fork 210 to its original position when the supporting force of the actuating element 300 to be described later disappears. That is, the latch fork 210 is rotated when the actuating element 300 rotates, thereby the latch fork elastic member 200 is deformed, and when the actuating element 300 is rotated to its original position, the latch fork elastic member 220 is restored, thereby the latch fork 210 is returned to its original position.

The latch fork elastic member 220 is installed on the frame part 100 side and is compressively deformed when the latch fork 210 rotates. For example, a body of the latch fork elastic member 220 is installed in the latch cover 120, and one end thereof is fixed to the latch fork 210, and the opposite end thereof is fixed to the latch cover 120. In addition, the latch fork elastic member 220 may be a coil spring, and the body of the latch fork elastic member 220 may be installed in a state being wound on one portion thereof, which corresponds to the rotation shaft of the latch fork 210.

In addition, the latch fork body 213 has the latch fin 213*a* being supported on the actuating element 300 when the actuating element 300 rotates. The latch fin 213*a* may be provided in the latch fork body 213 by being installed in a latch fin fastening portion formed in the latch fork body 213. The latch fin 213*a* is disposed to pass through a fin receiving portion 236 to be described later, and the actuating element 300 may support on the latch fin 213*a* to transfer the rotation force. In addition, the latch fin 213*a* may be provided in the latch fork body 213, and may be disposed at a position spaced apart from the actuating element 300 in one direction.

Furthermore, the latch fork body 213 may include an elastic member fixing portion 213*b*, in which a auxiliary latch elastic member 240 to be described later is installed, and an elastic member supporting wall 213*c*, on which one end of the auxiliary latch elastic member 240 is supported.

The latch fin 213*a*, the elastic member fixing portion 213*b*, and the elastic member supporting wall 213*c* may protrude from a surface opposing to the auxiliary latch 230 of the latch fork body 213.

The latch fork 210 may be made of different materials. The latch fork 210 may consist of a latch fork insert member 210*b*, and a latch fork outer layer section 210*a* formed to cover the latch fork insert member 210*b* and having a lower rigidity than the latch fork insert member 210*b*. In more detail, with the latch fork insert member 210*b* inserted in an injection mold, the latch fork 210 may be integrally formed through injection molding. For example, the latch fork insert member 210*b* may be formed of a metal material such as steel, and the latch fork outer layer section 210*a* may be formed to cover the latch fork insert member 210*b*.

Since the latch fork 210 consists of the latch fork outer layer section 210*a* and the latch fork insert member 210*b* and thus, the latch fork 210 is formed of soft materials only, the latch fork 210 may be prevented from deformation caused by collision with neighboring parts or by supporting on neighboring parts, thereby preventing occurrence of a clearance. In addition, the latch fork 210 made of different materials is formed of a hard material only, therefore, the latch fork 210 may prevent noise caused by collision with neighboring parts and absorb vibration occurred during the operation.

The latch fork outer layer section 210*a* may include at least one friction-reducing rib 217 formed to prevent friction with the main plate 110 or the auxiliary latch 230 during a rotation. The friction-reducing rib 217 may protrude toward the main plate 110 and the auxiliary latch 230, respectively, from the latch fork outer layer section 210*a*.

Further, a portion of the latch fork outer layer section 210*a* may be removed to expose the latch fork insert member 210*b* so as to reduce clearances between parts. For example, the elastic member supporting portion 216*b* may be formed by exposing the latch fork insert member 210*b*, and may be assembled with the latch fork elastic member 220 without a clearance.

In addition, when the latch fork 210 closes the opening 111, at least a portion of the latch fork 210 is inserted into a portion between the first latch fork support 133 and the second latch fork support 134 to be fixed in one direction to the steel plate 130. That is, when the latch fork 210 closes the opening 111, at least a portion of the latch fork 210 is insertion-fitted into the steel plate 130, and is fixed in position in the forward and rearward directions of the vehicle.

FIGS. 7 and 8 illustrate a state in which the main plate 110 is separated from the seat-back locking device 10, and a state in which the latch fork 210 closes the opening 111.

When the lever is not pulled and the operating force is not input into the lever, the latch fork 210 closes the opening 111. At this time, the restoring force of the latch fork elastic member 220 is applied to the latch fork 210 and the latch fork 210 is insertion-fitted into a portion between the first latch fork support 133 and the second latch fork support 134. Since the latch fork 210 is insertion-fitted into a portion between the first latch fork support 133 and the second latch fork support 134 and is fixed in position in forward and rearward directions of the vehicle, the position of the latch fork 210 in forward and rearward directions of the vehicle is fully fixed.

That is, the latch fork 210 is rotatably installed in the frame part 100 through the supporting member 250, however in a state in which the latch fork 210 closes the opening 111, the latch fork 210 is insertion-fitted into a portion between the first latch fork support 133 and the second latch fork support 134 to be fixed directly to the steel plate 130. In this state, even if the assembling variation exists between the supporting member 250 and the frame part, and between the supporting member 250 and the latch fork 210, a portion between the supporting member 250 and the latch fork 210 is supported without the clearance, thereby the position of the latch fork 210 in forward and rearward directions of the vehicle is fully fixed.

In particular, in the latch fork 210, the latch fork outer layer section 210*a* is formed by cutting a portion coming into contact with the first latch fork support 133 and the second latch fork 134, and the first latch fork support 133 and the second latch fork 134 come into contact with the latch fork insert member 210*b*.

In the latch fork 210, a portion of the first fork portion 214 and a portion of the second fork portion 215 may be insertion-fitted into a portion between the first latch fork support 133 and the second latch fork 134. The latch fork 210 may include a first plate support 214*a* contacting the first latch fork support 133 on a rear surface of the first fork portion 214, and a second plate support 215*a* contacting the second latch fork support 134 on a forward surface of the second fork portion 215.

In addition, the first plate support 214*a* may include a first exposure hole 214*b* formed by cutting a portion of the latch fork outer layer section 210*a*, and the latch fork insert member 210*b* may be exposed through the first exposure hole 214*b*. Further, the first latch fork support 133 may directly support the latch fork insert member 210*b*. Moreover, the second plate support 215*a* may include a second exposure hole 215*b* formed by cutting a portion of the latch fork outer layer section 210*a*, and the latch fork insert member 210*b* may be exposed through the second exposure hole 215*b*. In addition, the second latch fork support 134 may directly support the latch fork insert member 210*b*.

Therefore, it is possible to prevent the latch fork outer layer section 210*a* from the deformation between the steel plate 130 and the latch fork 120 and clearances therebetween, and the latch fork 120 may be separated from the steel plate 130 when being plastically deformed. Accordingly, impact of the collision is transferred to the front upon vehicle collision, and when the striker 20 collides with the first locking part 211, the striker 20 is prevented from separation from the opening 111 by the latch fork 210 and the first latch fork support 133. That is, an upper portion of the first locking part 211 is integrally formed in the latch fork body 213 and is supported, and a lower portion of the first locking part 211 is supported on the first latch fork support 133, and the first locking part 211 may be separated when being plastically deformed. In addition, even if the first locking part 211 is plastically deformed, the first locking part 211 is secondarily supported by a protrusion wall 112*b* of the main plate 110, thereby preventing the striker 20 from separating from the opening 111.

Besides, since the one surface 211*a* of the first locking part 211 supported by the striker is formed to be inclined, a moment is generated in a direction in which the latch fork 210 closes the opening 111, when the striker 20 moves from the opening 111 toward a rearward side.

Meanwhile, the auxiliary latch 230 is provided to get rid of a clearance between the latch fork 210 and the striker 20. The auxiliary latch 230 rotates relatively to the latch fork 210, and may get rid of the clearance between the locking parts 211 and 212 and the striker 20. The auxiliary latch 230 is rotatably installed in the frame part 100, and rotates together with the latch fork with a rotation clearance in a rotational direction so as to bring the striker 20 into close contact with the latch fork 210.

The auxiliary latch 230 includes at least one pressing portions 232 and 233 supporting the striker 20 toward the locking parts 211 and 212 so as to remove clearances between the locking parts 211 and 212 and the striker 20. When viewing the latch part 200 from the front, the pressing portions 232 and 233 may be formed to have a greater amount of protrusion protruding inward of the locking parts 211 and 212 gradually as the auxiliary latch 230 rotates in a state in which the latch fork 210 does not rotate.

In more detail, surfaces of the pressing portions 232 and 233 supporting the striker 20 are formed to have longer reference lengths toward one direction. At this time, the one direction means a direction in which the latch fork 210 rotates to open the opening 111, and the reference length means a length of a straight line from a rotation center point to one point of the auxiliary latch 230.

Referring to FIG. 10*a*, the reference length L1 from one point A1 is formed to be longer than a reference point L2 from the other point A2 disposed in the other direction different from that of the one point A1. In the drawing, a reference circle C is illustrated, and when compared with the reference circle C, the reference length L1 from the one point A1 is formed to be longer than the reference point L2 from the other point A2. In addition, when compared with the reference circle C, the pressing portions 232 and 233 are formed to have a longer reference length toward one direction. That is, in a state in which the striker 20 is restricted within the latch fork 210, as the auxiliary latch 230 rotates in the other direction, a portion of the pressing portions 232 and 233 having a longer reference length supports the striker 20. The more the auxiliary latch 230 rotates in the other direction, the more the pressing portions 232 and 233 protrude inward of the locking parts 211 and 212.

Accordingly, even if the striker 20 is inserted into locking parts 211 and 212, a clearance is formed between the locking parts 211 and 212 and the striker 20, and when the auxiliary latch 230 rotates relatively to the latch fork 210, the pressing portions 232 and 233 support the striker 20, thereby preventing moving of the striker 20. Here, the relative rotation of the auxiliary latch 230 to the latch fork 210 means a state in which only the auxiliary latch 230 rotates with the latch fork 210 being stopped.

When the pressing portions 232 and 233 support the striker 20 toward the one surfaces 211*a* and 212*a* of the locking parts 211 and 212, the striker 20 is fixed between the pressing portions 232 and 233 and the one surfaces 211*a* and 212*a* of the locking parts 211 and 212. In addition, the striker 20 is fixed by the pressing portions 232 and 233 in a state being spaced apart from other surfaces 211*b* and 212*b* opposing to the one surfaces 211*a* and 212*a* of the locking parts 211 and 212.

Meanwhile, the present disclosure is described based on a multi-stage latch structure, and as illustrated in the drawings, the present disclosure is described based on a state in which the first locking part 211 and the second locking part 212 are provided in the latch fork 210, and the first pressing portion 232 and the second pressing portion 233 configured to support the striker 20 toward the first locking part 211 or the second locking part 212 are provided in the auxiliary latch 230.

In addition, the first pressing portion 232 and the second pressing portion 233 may include a first pressing guide portion 232*a* and a second pressing guide portion 233*a*, each of which has a tip end in the other direction formed to be inclined, or to be round and is configured to guide the striker 20. Since the first pressing guide portion 232*a* and the second pressing guide portion 233*a* are provided, the striker 20 may ride on the first pressing guide portion 232*a* and the second pressing guide portion 233*a* to be guided to the first pressing portion 232 and the second pressing portion 233 when the restoring force of the auxiliary latch elastic member 240 to be described later is applied to the striker 20.

The latch part 200 may further include the auxiliary latch elastic member 240 configured to elastically support between the auxiliary latch 230 and the latch fork 210. The auxiliary latch elastic member 240 is installed on the latch fork 210 side, and may be compressively deformed when the auxiliary latch 230 rotates more in one direction than the latch fork 210. In more detail, the auxiliary latch elastic member 240 is provided in a shape in which a body thereof is wound on the elastic member fixing portion 213*b* of the latch fork and an end on one side thereof to be fixed to or supported on the elastic member supporting wall 213*c*. In addition, the auxiliary latch elastic member 240 is provided in a way in which an end on the opposite side thereof to be fixed to or supported on the auxiliary latch 230, thereby being compressively deformed when the auxiliary latch 230 rotates relatively to the latch fork 210.

In addition, the auxiliary latch 230 may rotate relatively to the latch fork 210 within a relative rotational displacement to the latch fork 210, and may rotate while being supported on the latch fork 210. That is, the auxiliary latch 230 rotates together with the latch fork 210 when the latch fork 210 rotates, with the rotation clearance in the rotational direction to the latch fork 210. The seat-back locking device 10 has a configuration, in which the actuating element 300 rotates to rotate the latch fork 210, and the latch fork 210 rotates to rotate the auxiliary latch 230. In addition, the seat-back locking device 10 has a configuration, in which, when the rotation clearance between the actuating element 300, the latch fork 210, and the auxiliary latch 230 disappears, the actuating element 300, the latch fork 210, and the auxiliary latch 230 rotate together.

The auxiliary latch 230 includes a auxiliary latch body 231. The auxiliary latch body 231 is formed in a shape of a plate, and has an insertion space 231*b* formed by cutting a lower portion of the auxiliary latch body 231 by a certain length. In addition, in the auxiliary latch body 231, a second through hole 231*a* allowing the supporting member 250 to pass therethrough and to be inserted thereinto is formed. The second through hole 231*a* may be formed at a forward position of the auxiliary latch body 231, and the first pressing portion 232 may be a rearward end of the auxiliary latch body 231, and a surface of the first pressing portion 232 supporting the striker 20 may be a rearward end surface of the auxiliary latch body 231. In addition, the second pressing portion 232 may be a portion adjacent to the insertion space 231*b* of the auxiliary latch body 231, and a surface of the second pressing portion 233 supporting the striker 20 may be a forward inner surface of the insertion space 231*b*.

In addition, the auxiliary latch 230 includes the fin receiving portion 236 allowing the latch fin 213*a* to be inserted thereinto to become movable and to rotate relatively to the latch fork 210 while rotating together with the latch fork 210.

For example, the fin receiving portion 236 may be formed with a thickness allowing the striker 20 to be inserted thereinto, and may be a long hole in an arc shape formed along an arc shape centering around about the rotation center point of the auxiliary latch 230. For another example, as illustrated in the drawings, the fin receiving portion 236 may be a space formed between the auxiliary latch body 231 and a fin supporting portion 235.

In more detail, the auxiliary latch body 231 may include the fin supporting portion 235, which is a side of the auxiliary latch body 231 that protrudes. In addition, the fin receiving portion 236, which is inserted between the fin supporting portion 235 and the auxiliary latch body 231 so as to be movable, is provided in the auxiliary latch body 231. The latch fin 213*a* moves between the fin supporting portion 235 and the auxiliary latch body 231, and allows the auxiliary latch 230 to rotate relatively to the latch fork 210. The latch fork 210 and the auxiliary latch 230 have the rotation clearance in the rotational direction by as much as movement of the latch fin 213*a* between the fin receiving portion 235 and the auxiliary latch body 231. Therefore, the auxiliary latch 230 may rotate relatively to the latch fork 210 by as much as movement of the latch fin 213*a* in the fin receiving portion 236.

In addition, the auxiliary latch elastic member 240 is installed in the elastic member fixing portion 213*b*, and one end of the auxiliary latch elastic member 240 may be fixed to the elastic member supporting wall 213*c*, and an end opposite to the one end may be fixed to the auxiliary latch body 231.

In other words, in a state in which the latch fork 210 does not rotate, the auxiliary latch 230 may compressively deform the auxiliary latch elastic member 240 while rotating in one direction. In addition, in a state in which the latch fork 210 does not rotate, the auxiliary latch 230 may rotate in the other direction as the auxiliary latch elastic member 240 is restored.

Meanwhile, referring to FIGS. 9*a* to 9*c*, a restriction releasing structure, by which the latch part 200 releases the striker from restriction and opens the opening 111 according to the lever operation, will be described.

In order to adjust an angle of the seat back or fold the seat back, the lever is pulled to apply an external force or a button is operated, and the operating force to pull the lever is transferred to the actuating element 200 through the cable. In particular, the lever operation is necessary to fix the seat back in the second-stage locking state.

According to the lever operation, when the actuating element 300 rotates in one direction, as illustrated in FIG. 9*a*, the actuating element 300 contacts the latch fin 213*a*, and the actuating element 300 rotates the latch fin 213*a*. The actuating element 300 rotates together with the latch fork 210 in one direction.

Here, when the actuating element 300 rotates more in one direction, as illustrated in FIG. 9*b*, the latch fin 213*a* contacts the fin supporting portion 235 and the latch fin 213*a* rotates the auxiliary latch 230. The actuating element 300, the latch fork 210, and the auxiliary latch 230 rotate together in one direction. At this time, when the latch fin 213*a* moves in the fin receiving portion 236 to contact the fin supporting portion 235, the auxiliary latch elastic member 240 is restored. In addition, when the latch fin 213*a* rotates the auxiliary latch 230, the auxiliary latch 230 may be spaced apart from the striker 20 while rotating in one direction.

Next, when the actuating element 300 rotates more in one direction, as illustrated in FIG. 9*c*, the actuating element 300, the latch fork 210, and the auxiliary latch 230 rotate together in one direction, and the latch fork 210 opens the opening 111, thereby releasing the restriction of the striker 20. This is a state in which the lever is fully pulled, and in this state, angle adjustment and folding of the seat-back is possible.

In addition, when the actuating element 300 rotates, the actuating element elastic member 301 is compressively deformed, and when the latch fork 210 rotates, the latch fork elastic member 220 is compressively deformed.

For example, referring to FIGS. 10*a* to 10*c*, a restriction operating structure, by which the striker 20 is restricted within the first locking part 211, will be described.

In a state of FIG. 9*c*, it is possible to move the striker 20 to the first locking part 211 or the second locking part 212, or separate the striker 20 from the opening 111. When removing an external force which has been applied to the lever in a state in which the striker 20 is moved, the actuating element 300 and the latch fork 210 are rotated in the other direction by the restoring force of the actuating element elastic member 301 and the latch fork elastic member 220, respectively.

In addition, when the striker 20 is locked in the first-stage locking position as only the latch part 200 rotates, the latch part 200 rotates in the other direction by the restoring force of the latch fork elastic member 220.

Referring to FIG. 10*a*, it is a state in which the auxiliary latch 230 rotates relatively to the latch fork 210 in the other direction by the restoring force of the auxiliary latch elastic member 230, and the auxiliary latch 230 rotates in the other direction together with the latch fork 210.

In addition, when the latch fork 210 rotates more in the other direction by the restoring force of the latch fork elastic member 220, as illustrated in FIG. 10*b*, the rotation of the latch fork 210 is completed as the striker 20 is inserted into and restricted within the first locking part 211 of the latch fork 210. However, as the first pressing guide portion 232*a* contacts the striker 20, the auxiliary latch 230 cannot rotate more in the other direction, and only the latch fork 210 can rotate more in the other direction. At this time, the auxiliary latch elastic member 240 is elastically deformed. In addition, the latch fork 210 is insertion-fitted into a portion between the first latch fork supporting portion 133 and the second latch fork supporting portion 134 by the restoring force of the latch fork elastic member 220.

Next, in a state in which the latch fork 210 is fixed, the auxiliary latch 230 rotates in the other direction by the restoring force of the auxiliary latch elastic member 240, and as illustrated in FIG. 10*c*, the auxiliary latch 230 brings the striker 20 into close contact with the one surfaces 211*a* and 212*a* of the first locking part 211. The auxiliary latch 230 supports the striker 20 with the one surfaces 211*a* and 212*a* of the first locking part 211 by the restoring force of the auxiliary latch elastic member 240, spaces the striker 20 apart from the other surfaces 211*b* and 212*b* of the first locking part 211, and fixes the striker 20 together with the first locking part 211. In addition, the striker 20 is guided by the first pressing guide portion 232*a*, moves to the one surfaces 211*a* and 212*a* of the first locking part 211, and is pushed to the one surfaces 211*a* and 212*a* of the first locking part 211 to be fixed, as the auxiliary latch 230 rotates in the other direction.

Meanwhile, in FIGS. 13 to 15, a seat-back locking device 10 according to another embodiment of the present disclosure is illustrated, and a protrusion 340 configured to block the entry of the striker 20 is provided in the actuating element 300.

Referring to FIG. 13, the actuating element 300 may include the protrusion 340 formed to protrude from the fin pressing portion 320 to block moving of the striker 20, which moves along the opening 111. That is, the protrusion 340 blocks the striker 20 from moving along the opening 111 to move to the second-stage locking position. The protrusion 340 is disposed to a position corresponding to the opening 111, in an initial state in which the external force is not applied to the actuating element 300, and serves to block the striker 20 from moving forward of the vehicle and places the striker 20 in the first-stage locking position.

The protrusion 340 may be formed by protruding downward from the fin pressing portion 320 and protruding rearward of the vehicle along the opening 111. In addition, the protrusion 340 may include an obstruction 341 protruding downward from the protruding end. The obstruction 341 is disposed in a space between the end of the protrusion 340 and a lower surface of the opening 111 and serves to obstruct the entry of the striker 20 into the second-stage locking position.

The protrusion 340 and the obstruction 341 are disposed to be adjacent to the first-stage locking position of the opening 111, and may close a part of the opening 111 when the latch part 200 is rotated by a collision with the striker 20.

The seat-back locking device 10 according to the present disclosure may rotate the seat back to adjust it to the first-stage locking state, or to the second-stage locking state, in a state in which the seat back is folded.

First, when adjusting the seat back to the first-stage locking state, only a motion of rotating the seat back rearward without pulling the lever may allow the seat back to be adjusted to the first-stage locking state. That is, when rotating the seat back rearward in a state in which the seat back is folded, the seat back is adjusted to the first-stage locking state and the position of the seat back is fixed therein.

In more detail, by rotating the seat back rearward, the striker 20 is supported on the rotation guide surface 214*c* of the first fork portion 214, which is the rear-most surface of the latch fork 210. The latch fork 210 rotates in one direction by the supporting force of the striker 20, and the auxiliary latch 230 rotates together with the latch fork 210 in the one direction. The striker 20 is inserted into the opening 111 when the auxiliary latch 230 rotates, and is supported on the other surface 211*b* of the first locking part 211 to stop in the first-stage locking position.

Here, when the latch fork 210 rotates with a large curvature instantaneously in one direction by the supporting force of the striker 20, the striker may become capable of entering the inside of the opening 111.

Therefore, the actuating element 300 according to the present disclosure includes the protrusion 340 and the obstruction 341, thereby preventing the striker 20 from moving to the second-stage locking position of the opening 111, even if the latch part 200 is rotated in one direction by the striker 20.

Referring to FIG. 14, even if the latch fork 210 rotates in one direction by the supporting force of the striker 20, the actuating element 300 does not rotate, and the striker 20 is supported on the protrusion 340 and the obstruction 341, and thus, cannot move to the second-stage locking position. Here, the actuating element 300 only rotates when the external force is applied or the restoring force of the actuating element elastic member 301 is applied to the actuating element 300.

In addition, when the latch fork 210 rotates in one direction by the supporting force of the striker 20, the latch fork elastic member 220 is elastically deformed. The latch fork 210, again, rotates in the other direction by the restoring force of the latch fork elastic member 220 and restricts the striker 20, as the same as the restriction operating structure illustrated in FIGS. 10*a* to 10*c*. Further, when the latch fork 210 instantaneously rotates in one direction by the supporting force of the striker 20, the striker 20 may be restricted after moving to the first-stage locking position.

As such, the actuating element 300 includes the protrusion 340 and the obstruction 341 as a safety means, by which the striker 20 is moved to the first-stage locking position only, when the lever is not operated.

In addition, when pulling the lever, as illustrated in FIG. 15, the actuating element 300 rotates in one direction as well, and as the actuating element 300 rotates the latch part 200, the striker 20 may move to the second-stage locking position. Surely, in this state, the striker 20 may move to the first-stage locking position as well. Also, when pulling the lever, as the same as the restriction releasing structure illustrated in FIGS. 9*a* to 9*c*, the actuating element 300 and the latch part 200 rotate in one direction, thereby releasing the restriction of the striker 20.

In addition, when removing the operating force applied to the lever, the actuating element 300 is rotated to its original position by the restoring force of the actuating element elastic member 301, and as the same as the restriction operating structure illustrated in FIGS. 10*a* to 10*c*, the actuating element 300 and the latch part rotate in the other direction, thereby restricting the striker 20.

According to the embodiments of the present disclosure having such shapes and structures, there is an effect of minimizing a clearance between the striker and the latch part, since the latch part is provided with the two-stage catch structure, even if the location variation of the striker, quality variation of the parts and assembling variation occur.

In addition, by minimizing the clearance between the striker and the latch part, it is advantageous in that the conventional rattle noise and the friction noise may be reduced, and by removing the bump feeling which used to be generated during the operation of the seat back, there is an effect of removing uncomfortableness that has occurred when operating the conventional seat back.

In addition, by having a damper supporting the striker in the vertical direction and the left and right directions of the vehicle, there is an effect of completely fixing moving between the striker and the seat back.

In addition, there is an effect in that, when a separation force is applied to the striker, a moment is generated in the direction, in which the latch fork closes the opening, in the latch part, thereby preventing the striker from the separation.

Further, there is an effect of preventing the latch part from deformation, even if the separation force is applied to the striker, since the present disclosure provides the steel plate.

Moreover, there is an effect of securing the safety of the passengers, since the present disclosure provides the main plate capable of secondarily supporting the deformed latch part, even if the latch part is plastically deformed.

In addition, there is an effect of stably fixing the striker by fixing the latch fork in one direction, since the present disclosure provides the structure in which the latch fork is directly insertion-fitted into the frame part.

Moreover, when rotating the seat back without the lever operation, there is an effect of placing the seat back in the first-stage locking position without the lever operation, since when the striker collides with the latch fork, the striker may move to the first-stage locking position, while only the latch part rotates.

In addition, as the protrusion and the obstruction are provided in the lever member, it is advantageous in that, when rotating the seat back without the lever operation, the striker may be restricted to stay at the first-stage locking position to restrict the position of the striker, and the operation of the seat back to move to the first-stage locking position and the second-stage locking position is made easy.

Therefore, there is an effect in that the user may adjust the rotation angle of the seat back easily, and the product reliability may be given to the user.

Although some embodiments have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

REFERENCE NUMERALS

10: seat-back locking device
20: striker
100: frame part
110: main plate
111: opening
112: outer wall portion
120: latch cover
121: striker insertion portion
122: damper insertion portion
123: elastic piece
130: steel plate
131: plate coupling portion
132: third fastening hole
133: first latch fork support
134: second latch fork support
135: cover supporting portion
140: damper
141: damper body
142: extension portion
143: elastic piece support
200: latch part
210: latch fork
210*a*: latch fork outer layer section
210*b*: latch fork insert member
211: first locking part
212: second locking part
213: latch fork body
213*a*: latch fin
214: first fork portion

214*a*: first plate support
214*b*: first exposure hole
215: second fork portion
215*a*: second plate support
215*b*: second exposure hole
216: third fork portion
220: latch fork elastic member
230: auxiliary latch
231: auxiliary latch body
232: first pressing portion
233: second pressing portion
234: connecting portion
235: fin supporting portion
236: fin receiving portion
240: auxiliary latch elastic member
250: supporting member
300: actuating element
301: actuating element elastic member
310: rivet connecting portion
320: fin pressing portion
330: lever connecting portion
340: protrusion

What is claimed is:

1. A seat-back locking device, comprising:

a frame part installed in a seat back and having an opening into which a striker fixed to a vehicle body is inserted; and a latch fork rotatably installed in the frame part and configured to open or close the opening so as to restrict or release the striker within the opening; and wherein the frame part comprises a steel plate configured such that at least one portion of the latch fork to be insertion-fitted into the steel plate when the latch fork closes the opening, wherein the steel plate includes a first latch fork support and a second latch fork support spaced apart from each other in one direction, and wherein, when the latch fork closes the opening, the latch fork is inserted between the first latch fork support and the second latch fork support and is supported by the steel plate without clearance so as to be fixed in forward and rearward directions of the vehicle.

2. The seat-back locking device of claim 1, wherein the frame part further comprises a main plate in which the opening is formed, and wherein the steel plate is coupled to the main plate with the latch fork interposed therebetween.

3. The seat-back locking device of claim 1, wherein the latch fork consists of a latch fork insert member, and a latch fork outer layer section configured to cover the latch fork insert member and having a lower rigidity than the latch fork insert member, and wherein the latch fork is formed as the latch fork outer layer section at which the first latch fork support and the second latch fork support contact each other is cut, and the first latch fork support and the second latch fork support contact the latch fork insert member.

4. The seat-back locking device of claim 2, wherein the main plate has an outer wall portion, which is an outer periphery thereof protruding toward the steel plate, wherein the outer wall portion has a pair of spaced ends spaced apart from each other by a space connected to the opening, and wherein when the latch fork is deformed by a vehicle collision, the spaced ends support the deformed latch fork.

5. The seat-back locking device of claim 4, wherein the frame part further comprises:

a latch cover having a striker insertion portion configured to allow the striker to be inserted thereinto, and at least one elastic piece protruding toward the striker; and a damper installed in the latch cover and configured to support the elastic piece toward the striker, and wherein the steel plate has a cover support configured to surround the striker insertion portion.

6. The seat-back locking device of claim 4, wherein the latch fork comprises:

a first locking part configured to be recessed at a lower end of the latch fork and allows the striker to be inserted thereinto;

a second locking part configured to be recessed at a lower end of the latch fork, spaced apart from the first locking part in a forward direction of a vehicle, and allows the striker to be inserted thereinto; and a rotation guide surface formed to be inclined on a surface exposed between the spaced ends of the first locking part and configured to rotate the latch fork when the striker is supported, and wherein the striker is configured to be restricted by the first locking part in a first-stage locking state, or to be restricted by the second locking part in a second-stage locking state.

7. The seat-back locking device of claim 6, further comprising:

an actuating element configured to rotate, and to rotate the latch fork when an external force is applied to a lever, wherein when a direction in which the latch fork rotates so as to open the opening is considered as one direction, the actuating element is configured to rotate in the one direction so as to rotate the latch fork when an external force is applied to the lever, and only the latch fork rotates in the one direction, when the striker supports the latch fork.

8. The seat-back locking device of claim 7, wherein the actuating element has a protrusion protruding from one side of the actuating element and configured restrict moving of the striker that moves along the opening so as to prevent the striker from moving to a second-stage locking position.

9. The seat-back locking device of claim 7, wherein the latch fork has a latch fin formed at a position spaced apart from the actuating element in the one direction so as to be supported on the actuating element when the actuating element rotates in the one direction.

* * * * *